US008189585B2

(12) United States Patent
Dharwadkar et al.

(10) Patent No.: US 8,189,585 B2
(45) Date of Patent: May 29, 2012

(54) TECHNIQUES FOR VIRTUAL PRIVATE NETWORK FAST CONVERGENCE

(75) Inventors: Pranav Dharwadkar, San Jose, CA (US); Ramanan Subramanian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 11/546,054

(22) Filed: Oct. 10, 2006

(65) Prior Publication Data

US 2008/0084881 A1    Apr. 10, 2008

(51) Int. Cl.
*H04L 12/28* (2006.01)
*H04L 12/56* (2006.01)
(52) U.S. Cl. ........ 370/392; 370/249; 370/350; 370/352; 370/359; 370/386; 370/389; 370/401
(58) Field of Classification Search .................. 370/249, 370/389, 352, 401
See application file for complete search history.

(56) References Cited

U.S. PATENT DOCUMENTS

| | | | | |
|---|---|---|---|---|
| 6,658,458 | B1* | 12/2003 | Gai et al. | 709/215 |
| 6,721,316 | B1* | 4/2004 | Epps et al. | 370/389 |
| 2001/0042130 | A1* | 11/2001 | Brown | 709/238 |
| 2004/0196827 | A1* | 10/2004 | Xu et al. | 370/352 |
| 2005/0147051 | A1* | 7/2005 | Suri | 370/249 |
| 2006/0031490 | A1* | 2/2006 | Provine et al. | 709/225 |
| 2006/0262735 | A1* | 11/2006 | Guichard et al. | 370/254 |
| 2006/0291446 | A1* | 12/2006 | Caldwell et al. | 370/351 |

OTHER PUBLICATIONS

E. Rosen, et al., "BGP/MPLS VPNs," Memo, Network Working Group Request for Comments: 2547, dated Mar. 1999, 25 pgs.
E. Rosen, et al., "Multiprotocol Label Switching Architecture," Memo, Network Working Group Request for Comments: 3031, dated Jan. 2001, 61 pgs.
U.S. Appl. No. 11/546,053, filed Oct. 10, 2006, Final Office Action, Jun. 9, 2010.

* cited by examiner

*Primary Examiner* — Jae Y Lee
(74) *Attorney, Agent, or Firm* — Hickman Palermo Truong & Becker LLP

(57) ABSTRACT

An apparatus for VPN fast convergence in MPLS networks is disclosed. The apparatus comprises a first memory portion, a second memory portion, and a first logic for programming the memory portions. The first memory portion comprises a plurality of first data structures, where each of the plurality of first data structures includes an IGP label and an adjacency identifier that identifies one of a plurality of outgoing interfaces associated with the apparatus, where each IGP label indicates a Label Switched Path (LSP) through a network. The second memory portion comprises a plurality of second data structures, where each of the plurality of second data structures includes a network address identifier, a VPN label associated with the network address identifier, and a pointer that indicates one of the plurality of first data structures in the first memory portion, where each VPN label identifies a VPN that is reachable over the network.

23 Claims, 7 Drawing Sheets

TECHNIQUES FOR VIRTUAL PRIVATE NETWORK FAST CONVERGENCE

TECHNICAL FIELD

The present disclosure generally relates to network packet forwarding.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In conventional packet forwarding, a packet is transmitted through a network from one router in the network to the next, where each router independently analyzes the packet header and makes an independent forwarding decision for the packet. More specifically, each router chooses a next hop router for the packet based on the packet header and on the results of a routing algorithm run by the router. In choosing the next hop router for a particular packet, each router first determines the destination address prefix to which the packet is sent, and then maps the destination address to the address of a router that is the next hop in the path to that destination.

The Multi-Protocol Label Switching (MPLS) protocol and the underlying architecture are described in *RFC*3031, which was published by the Internet Engineering Task Force (IETF) in January 2001, and which is hereby incorporated by reference for all purposes as if fully set forth herein. In MPLS packet forwarding, the determination of the destination address of each transmitted packet is done just once—at the ingress router, established at an edge of the network, at which the packet enters the network. Typically, the destination address would map to the network address of an egress router, also established at an edge of the network, at which the packet exits the network. At the ingress router, the destination address of the packet is indicated by a fixed-length, locally significant identifier that is referred to as an "MPLS label" or simply "label". When the ingress router receives an inbound packet, the router determines the label indicating the destination address for the packet based on information included in the packet header. The ingress router then creates a label stack that stores the looked-up label at the top. (As referred to herein, a "label stack" is a data structure that stores an ordered set of one or more MPLS labels.) Before the ingress router forwards the packet to its next hop, the ingress router attaches (prepends) the label stack to the beginning of the packet. The routers at subsequent hops do not perform any further analysis of the packet header; rather, each router at any subsequent hop uses the top label in the label stack as an index into a table and determines a table record which specifies the address of the next hop router for that particular label and a new top label. The router then swaps, or replaces, the top label in the packet label stack with the new top label from the table record, and forwards the packet to the next hop router. (In some implementations, MPLS forwarding may use the so called "penultimate hop popping" technique to process the label stack at the penultimate router that immediately precedes the egress router—instead of swapping a new top label onto the label stack, the penultimate router simply pops the top label from the label stack before sending the packet to the egress router.)

In a typical MPLS implementation, the destination address of an inbound packet received at an ingress router is associated with the Border Gateway Protocol (BGP) next hop address for the packet, where the BGP next hop address is the address of the egress router at which the packet must exit the network. Typically, the ingress router-learns the BGP next hop address from the egress router over a BGP session, and stores the BGP next hop address in one or more routing tables. In the routing tables, a BGP next hop address is typically associated with an Internal Gateway Protocol (IGP) label, which indicates a Label Switched Path (LSP) to the router at the next hop and, ultimately, leads to the egress router. An LSP is a path in the network between two routers that support MPLS forwarding, also known as "Label Switching Routers" (LSRs). An LSR in a particular LSP uses an IGP label to identify its adjacent LSR as the next hop router for packets sent along that LSP. An IGP label (which may also be referred to as an "LDP label") is an MPLS label that is locally significant between two LSRs; an upstream LSR typically receives the IGP label identifying an LSP from a downstream LSR over a Label Distribution Protocol (LDP).

Since in MPLS forwarding intermediate routers do not need to analyze packet headers and to run routing algorithms for each received packet, MPLS forwarding is generally faster than conventional packet forwarding for routing transit traffic across a network. For this reason, in a typical implementation, MPLS forwarding is used to route transit traffic across the network or networks of an Autonomous System (AS), where the transit traffic typically originates in, and is destined to, networks that are outside the AS. Examples of such AS networks include, but are not limited to, telecommunication networks and Internet Service Provider (ISP) networks that route network traffic originating from customer networks to any network destinations that are reachable through the telecommunication or ISP networks. Because in such typical MPLS forwarding implementations only the ingress routers perform packet header analysis on inbound packets, the performance of the ingress routers affects the performance of the entire AS network. For example, ingress routers in a typical ISP network may need to process and forward inbound packets at rates of 16 million packets per second and above.

In order to achieve forwarding at such high rates, router platforms typically provide hardware components for analyzing packet headers and making forwarding decisions. Examples of such router platforms include the Gigabit Switch Router (GSR) 12000 Series provided by Cisco Systems, Inc. of San Jose, Calif. The architecture of the Cisco 12000 Series routers is truly distributed and is provided on a hardware platform in which a gigabit route processor and multiple line cards are coupled over a crossbar switch fabric. Each line card is capable of performing forwarding functions independently, and includes its own processor and Application-Specific Integrated Circuits (ASICs) that are configured to process inbound packets and to make forwarding decisions. Each line card also includes its own memory for storing copies of Forwarding Information Base (FIB) tables that are computed by the gigabit route processor. For each packet received at a communication link interface of a line card, the line card ASICs perform independent lookup of the packet destination address in the line card FIB tables. Thereafter, the packet is switched across the crossbar switch fabric to the destination line card of the router.

However, several factors affect the ability of hardware components to process inbound network packets at the rates at which the packets are received. One of these factors is the amount of routing and forwarding information that is programmed in the router or line card memory. For example, for the purpose of MPLS forwarding, an ingress router established at the edge of an ISP network may need to store over half a million address prefixes to which MPLS traffic can be forwarded. (An address prefix may be expressed as a combination of a network address and a mask that indicates the bits of the address used to identify the network portion of the address.) Since the amount of fast memory in the router or line card is finite, the sheer scale of the routing and forwarding information that needs to be maintained affects the manner in which this information is stored in memory, which in turn affects how fast the hardware components can access this information.

Other factors, which affect the ability of hardware components to process inbound network packets at the rates at which the packets are received, involve the limitations of the hardware components themselves. For example, hardware components that make forwarding decisions can perform only a limited number of memory accesses for each received packet at the rate at which packets are received. The forwarding hardware components in most high capacity routers are capable of performing only a single memory access per packet at the rates at which packets are received by the routers. The forwarding ASICs in some line cards for the Cisco 12000 Series routers are capable of performing two memory accesses per packet at the maximum line card receiving rate.

These memory access limitations of the forwarding hardware components are apparent in routers performing MPLS forwarding for types of network traffic that need multiple memory accesses for making a forwarding decision. Examples of such types of network traffic include, but are not limited to, VPN traffic, Internet Protocol version 4 (IPv4) traffic, and IPv6 traffic. In addition, the memory access limitations of the forwarding hardware components are especially apparent in routers that are configured to perform MPLS forwarding in conjunction with network load-balancing and/or load-sharing because load-balancing and load-sharing may require even more memory accesses per packet for making a forwarding decision.

Other factors, which affect the ability of hardware components to process inbound network packets at the rates at which the packets are received, include the ability of the routers or line cards to modify the routing and forwarding information in memory at acceptably high rates without sacrificing the forwarding performance. For example, an ISP network may experience failures (or "flaps") on one or more IGP paths that are established between any of its ingress, intermediate, and egress routers. When an IGP path flaps, one or more of the affected routers typically compute new network routes around the flapped path and distribute these new routes to the affected routers over one or more IGP or internal BGP (iBGP) protocols. (A route comprises an address destination, which is usually represented by an address prefix, and information that describes the path to that address destination; in a network, the process of computing, distributing, and installing new routes at network infrastructure elements is referred to as "route convergence". Examples of IGP protocols include, but are not limited to, the Routing Information Protocol (RIP) and the Open Shortest Path First (OSPF) protocol.) From the perspective of an ingress router that provides MPLS forwarding over established LSPs, an IGP path flap between any two routers in the network would affect all LSPs that are established over the failed path. Thus, after an IGP path flap, the ingress router may receive numerous new routes and other routing information changes that affect the ingress router's LSPs, and the ingress router and/or line cards thereof need to update the routing information stored in memory at rates that are high enough and do not hinder forwarding performance.

Based on the foregoing, techniques are clearly needed for fast route convergence at ingress routers. Techniques are also clearly needed for storing routing and forwarding information in a router or line card in a manner that would provide unhindered forwarding performance while at the same time overcoming the memory access limitations of the hardware components that make the forwarding decisions.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
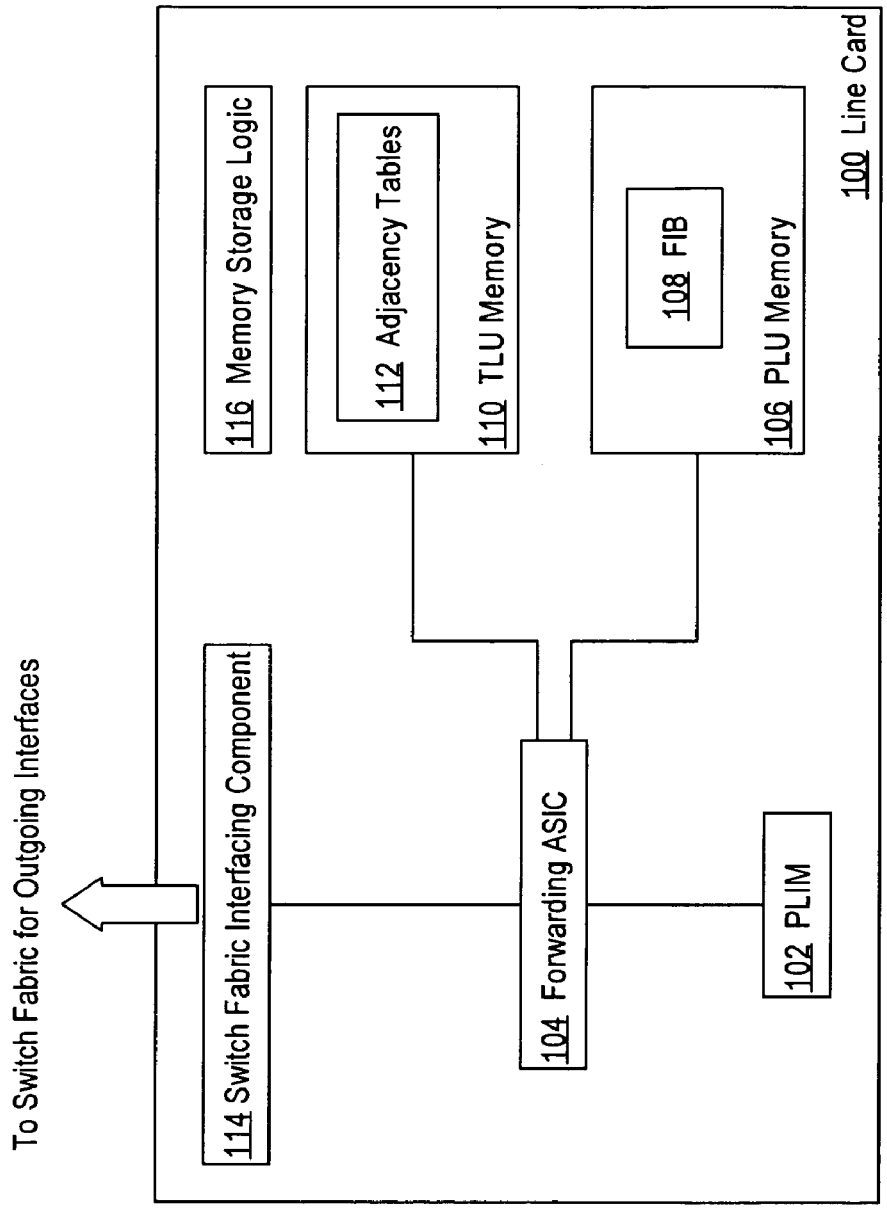
FIG. 1 is a block diagram that illustrates a high-level overview of a line card in which embodiments may be implemented.

A method and apparatus for VPN fast convergence and two-level load-balancing in MPLS networks are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview 2.0 Structural Overview 3.0 VPN Fast Convergence in MPLS Networks 3.1 Overview of MPLS VPNs 3.2 MPLS Forwarding by Using MPLS Rewrites 3.3 MPLS Forwarding for VPN Fast Convergence 3.4 VPN Fast Convergence with MPLS Load-Balancing 4.0 Two-Level Load-Balancing for non-VPN Traffic in MPLS Networks 4.1 Overview of MPLS Forwarding for non-VPN Traffic 4.2 Two-Level Load Balancing for non-VPN Traffic 5.0 Two-Level Load-Balancing for VPN Traffic in MPLS Networks
   5.1 Overview of Multi-Path VPNs
   5.2 Two-Level Load-Balancing for Multi-Path VPNs
6.0 Additional Features and Alternative Embodiments
7.0 Hardware Overview For a Software Forwarding Embodiment
8.0 Extensions and Alternatives 1.0 General Overview The needs identified in the foregoing Background, and other needs and objects that will become apparent for the following description, are achieved in the present invention, which comprises, in one aspect, an apparatus for fast VPN convergence in MPLS networks, the apparatus comprising a first memory portion, a second memory portion, and a first logic for programming the memory portions. The first memory portion comprises a plurality of first data structures, where each of the plurality of first data structures includes an Internal Gateway Protocol (IGP) label and an adjacency identifier that identifies one of a plurality of outgoing interfaces associated with the apparatus, where each IGP label indicates a Label Switched Path (LSP) through a network. The second memory portion comprises a plurality of second data structures, where each of the plurality of second data structures includes a network address identifier, a Virtual Private Network (VPN) label associated with the network address identifier, and a pointer that indicates one of the plurality of first data structures in the first memory portion, where each VPN label identifies a VPN that is reachable over the network. The first logic, when executed, is operable to store a plurality of IGP labels in the plurality of first data structures, and to store a plurality of VPN labels in the plurality of second data structures.

In a feature of this aspect, the apparatus is a line card that can be installed in any of a switch and a router. In another feature of the aspect, the network address identifier included in each of the plurality of second data structures is any one of an Internet Protocol (IP) address prefix and a Multi-Protocol Label Switching (MPLS) label.

In a feature of this aspect, the apparatus further comprises a forwarding Application-Specific Integrated Circuit (ASIC) that is operatively connected to the memory portions, where the forwarding ASIC when executed is operable to: retrieve a particular network address identifier from a particular packet that is received at the apparatus, where the particular packet may be any one of a Layer 3 network packet and a Layer 2 data link frame; identify the particular network address identifier in the second memory portion to determine a particular second data structure of the plurality of second data structures that stores the particular network address identifier; retrieve a particular pointer that is stored in the particular second data structure; based on the particular pointer, identify a particular first data structure of the plurality of first data structures in the first memory portion; and determine a forwarding of the particular packet to a particular outgoing interface of the plurality of outgoing interfaces, where the particular outgoing interface is indicated by a particular adjacency identifier that is stored in the particular first data structure. In this feature, the apparatus may further comprise a third memory portion that comprises a plurality of load-balancing entries, where each of the plurality of load-balancing entries includes two or more reference values that point to two or more of the plurality of first data structures in the first memory portion, and where the forwarding ASIC when executed is operable to: select a particular load-balancing entry of the plurality of load-balancing entries, and select a reference value from the two or more reference values included in the particular load-balancing entry, where the selected reference value points to the particular first data structure.

In another feature of this aspect, instead of or in addition to a forwarding ASIC, the apparatus may comprise a second logic for performing the functionalities of the forwarding ASIC by executing one or more software modules or components.

In one feature of this aspect, the second memory portion may be any one of an M-trie memory and a Ternary Content-Addressable memory (TCAM), the first memory portion may comprise one or more adjacency tables that store first information identifying adjacent network elements, and the second memory portion may comprise a Forwarding Information Base (FIB) that stores routing information.

In a feature of this aspect, the apparatus may be a line card in a packet router that can be installed at an edge of the network and can be configured for receiving network traffic from other networks and for sending the network traffic across the network over an MPLS protocol, where the network traffic received from the other networks can include any of IP packets and MPLS packets.

In another aspect, an apparatus for two-level load-balancing of VPN traffic in MPLS networks is provided. The apparatus comprises a first memory portion, a second memory portion, a third memory portion, a fourth memory portion, and logic for programming the memory portions. The first memory portion comprises a plurality of first data structures, where each of the plurality of first data structures includes an IGP label and an adjacency identifier that identifies one of a plurality of outgoing interfaces in the network element, where each IGP label stored in any one of the plurality of first data structures indicates an LSP through the MPLS network. The second memory portion comprises a plurality of IGP load-balancing entries, where each of the plurality of IGP load-balancing entries includes two or more reference values that point to two or more of the plurality of first data structures, and where any two or more IGP labels stored in any two or more of the plurality of first data structures, which are pointed to by any one of the plurality of IGP load-balancing entries, indicate two or more LSPs that all lead to a specific egress network element in the network. The third memory portion comprises a plurality of VPN load-balancing entries, where each of the plurality of VPN load-balancing entries includes an index value and a pointer that indicates one of the plurality of IGP load-balancing entries. The fourth memory portion comprises a plurality of second data structures, where each of the plurality of second data structures includes a network address identifier, a unique value associated with two or more of the plurality of VPN load-balancing entries, and two or more VPN labels associated with the network address identifier, where each two or more VPN labels stored in any one of the plurality of second data structures identify a VPN that is reachable over the network.

In a feature of this aspect, the apparatus may comprise a line card that can be installed in any network infrastructure element such as, for example, a switch or a router. In another feature, the network address identifier included in each of the plurality of second data structures may be any one of an IP address prefix and an MPLS label.

In one feature of the this aspect, the first memory portion comprises one or more adjacency tables that store first information identifying adjacent network elements, the third memory portion is a first TCAM, and the fourth memory portion is any one of an M-trie memory and a second TCAM, where the fourth memory portion comprises a FIB that stores routing information.

In a feature of this aspect, the apparatus comprises a line card in a packet router that can be installed at an edge of the network and can be configured for receiving network traffic from other networks and for sending the network traffic across the network over an MPLS protocol, where the network traffic received from the other networks can include any of IP packets and MPLS packets.

In one feature of this aspect, the apparatus comprises a forwarding ASIC that is operatively connected to the memory portions, where the forwarding ASIC when executed is operable to: retrieve a particular network address identifier from a particular packet that is received at the apparatus, where the particular packet is any one of a Layer 3 network packet and a Layer 2 data link frame; identify the particular network address identifier in the fourth memory portion to determine a particular second data structure of the plurality of second data structures that stores the particular network address identifier; calculate a particular hash value; retrieve a particular unique value that is stored in the particular second data structure; identify the particular unique value and the particular hash value in the third memory portion to determine a particular VPN load-balancing entry of the plurality of VPN load-balancing entries; retrieve a particular pointer that is stored in the particular VPN load-balancing entry; based on the particular pointer, determine a particular IGP load-balancing entry of the plurality of IGP load-balancing entries in the second memory portion; select a reference value from the two or more reference values included in the particular IGP load-balancing entry, where the selected reference value points to a particular first data structure of the plurality of first data structures in the first memory portion; and make a forwarding decision to dispatch the particular packet to a particular outgoing interface of the plurality of outgoing interfaces, where the particular outgoing interface is indicated by a particular adjacency identifier that is stored in the particular first data structure.

In another aspect, an apparatus for two-level load-balancing of non-VPN traffic in MPLS networks is provided. The apparatus comprises a first memory portion, a second memory portion, a third memory portion, a fourth memory portion, and logic for programming the memory portions. The first memory portion comprises a plurality of first data structures, where each of the plurality of first data structures includes an IGP label and an adjacency identifier that identifies one of a plurality of outgoing interfaces in the network element, where each IGP label stored in any one of the plurality of first data structures indicates an LSP through the MPLS network. The second memory portion comprises a plurality of IGP load-balancing entries, where each of the plurality of IGP load-balancing entries includes two or more reference values that point to two or more of the plurality of first data structures, and where any two or more IGP labels stored in any two or more of the plurality of first data structures, which are pointed to by any one of the plurality of IGP load-balancing entries, indicate two or more LSPs that all lead to a specific egress network element in the network. The third memory portion comprises a plurality of Border Gateway Protocol (BGP) load-balancing entries, where each of the plurality of BGP load-balancing entries includes an index value and a pointer that indicates one of the plurality of IGP load-balancing entries. The fourth memory portion comprises a plurality of second data structures, where each of the plurality of second data structures includes a network address identifier and a unique value associated with two or more of the plurality of BGP load-balancing entries.

In a feature of this aspect, the apparatus may comprise a line card that can be installed in any network infrastructure element such as, for example, a switch or a router. In another feature, the network address identifier included in each of the plurality of second data structures may be any one of an IP address prefix and an MPLS label.

In one feature of the this aspect, the first memory portion comprises one or more adjacency tables that store first information identifying adjacent network elements, the third memory portion is a first TCAM, and the fourth memory portion is any one of an M-trie memory and a second TCAM, where the fourth memory portion comprises a FIB that stores routing information.

In a feature of this aspect, the apparatus comprises a line card in a packet router that can be installed at an edge of the network and can be configured for receiving network traffic from other networks and for sending the network traffic across the network over an MPLS protocol, where the network traffic received from the other networks can include any of IP packets and MPLS packets.

In one feature of this aspect, the apparatus comprises a forwarding ASIC that is operatively connected to the memory portions, where the forwarding ASIC when executed is operable to: retrieve a particular network address identifier from a particular packet that is received at the apparatus, where the particular packet is any one of a Layer 3 network packet and a Layer 2 data link frame; identify the particular network address identifier in the fourth memory portion to determine a particular second data structure of the plurality of second data structures that stores the particular network address identifier; calculate a particular hash value; retrieve a particular unique value that is stored in the particular second data structure; identify the particular unique value and the particular hash value in the third memory portion to determine a particular BGP load-balancing entry of the plurality of BGP load-balancing entries; retrieve a particular pointer that is stored in the particular BGP load-balancing entry; based on the particular pointer, determine a particular IGP load-balancing entry of the plurality of IGP load-balancing entries in the second memory portion; select a reference value from the two or more reference values included in the particular IGP load-balancing entry, where the selected reference value points to a particular first data structure of the plurality of first data structures in the first memory portion; and make a forwarding decision to dispatch the particular packet to a particular outgoing interface of the plurality of outgoing interfaces, where the particular outgoing interface is indicated by a particular adjacency identifier that is stored in the particular first data structure.

In other aspects, the invention encompasses methods and computer-readable media for performing fast VPN route convergence and two-level load-balancing in MPLS networks.

2.0 Structural Overview

FIG. 1 is a block diagram that illustrates a high-level overview of a line card in which embodiments of the techniques for VPN fast convergence and two-level load-balancing in MPLS networks may be implemented. Line card 100 comprises Physical Line Interface Module (PLIM) 102, forwarding ASIC 104, Pointer-Look-Up (PLU) memory 106, Table-Look-Up (TLU) memory 110, memory storage logic 116, and switch fabric interfacing component 114. These components of line card 100 are included in the set of receiving components of the line card that are operable to process inbound packets. Line card 100 also comprises other components, such as, for example, one or more processors, a card scheduler and clock (CSC), and various shared memory buffers, as well as a set of transmitting components that are operable to transmit packets; however, these other components are not illustrated in FIG. 1 in order in order to avoid unnecessarily obscuring the present invention.

PLIM 102 is a set of hardware components, such as burst memory and ASICs, that collectively are operable to process packets (or other datagrams such as data link frames) that are received on a physical connection link. Depending on the type of connectivity used, the physical connection link may utilize optical or electrical signals to carry information. Typically, the components of PLIM 102 process a packet by first receiving and assembling the packet in burst memory, and then transferring the packet into a queue in memory (not shown in FIG. 1) that is shared with other components of line card 100, such as forwarding ASIC 104.

Forwarding ASIC 104 is operatively connected to PLIM 102, and is operable to access the shared memory queues that store received packets. In the embodiment illustrated in FIG. 1, forwarding ASIC 104 is operable to implement the techniques for VPN fast convergence and two-level load-balancing in MPLS networks that are described herein. In other embodiments, however, the techniques described herein may be implemented by multiple interconnected ASICs or by one or more processors that execute one or more stored sequences of instructions, such as, for example, software programs or modules. In addition, the forwarding ASICs used in different embodiments may operate by powering a series of logic gates or may include one or more ASIC processors that execute sequences of stored microcode instructions. Thus, the techniques for VPN fast convergence and two-level load-balancing in MPLS networks described herein are not limited to being implemented by any particular hardware or by any particular software programs, and for this reason the described embodiments including forwarding ASICs are to be regarded in an illustrative rather than a restrictive sense.

In the line card illustrated in FIG. 1, forwarding ASIC 104 makes a forwarding decision for each received packet according to the techniques for VPN fast convergence and two-level load-balancing in MPLS networks described herein. For a particular packet, forwarding ASIC 104 first examines the packet in the shared memory queue and retrieves the necessary packet header information, for example, a destination address or an MPLS label (if the packet was received from an adjacent network over an MPLS protocol). Based on the packet header information, forwarding ASIC 104 then looks up the packet header information in PLU memory 106 to determine a pointer to a data structure stored in TLU memory 110. Forwarding ASIC 104 extracts, from the TLU data structure, adjacency information that identifies the outgoing interface (of the router in which line card 100 is installed) from which the packet needs to be forwarded to the next hop. Once the outgoing interface for the packet is determined, the packet along with the relevant adjacency information is moved to a to-fabric memory queue; thereafter, switch fabric interfacing component 114 retrieves the packet from the to-fabric queue and sends it across the crossbar switch fabric to the outgoing interface. As described in the sections hereinafter, some particular embodiments may provide load-balancing for MPLS traffic. In these embodiments, in addition to the functionalities described above, in order to make a forwarding decision for a particular packet the forwarding ASIC 104 may look up additional information in TLU memory 110 or may execute one or more TCAM units in order to perform load-balancing for the packet.

According to one example embodiment of line card 100, forwarding ASIC 104 is communicatively and/or operatively connected to switch fabric interfacing component 114, which may comprise one or more ASICs. Component 114 and the ASICs thereof are operable to transfer packets (for which forwarding ASIC 104 has made a forwarding decision) from the to-fabric queue to the appropriate outgoing interface. Component 114 or an ASIC thereof first accesses a particular packet in the to-fabric queue and cuts the packet into cells of the same size, where each cell is prepended with header information indicating the outgoing interface to which the cell is to be sent. Thereafter, component 114 or an ASIC thereof sends the cells representing the packet across the crossbar switch fabric to the transmitting memory buffers of the outgoing interface, where the cells are assembled back into a packet. The transmitting components of the particular line card representing the outgoing interface then send the packet to the next hop router across the physical connection link that is connected to the line card.

Forwarding ASIC 104 is also operatively connected to PLU memory 106 and TLU memory 110. PLU memory 106 stores routing information that is organized as Forwarding Information Base (FIB) 108. In embodiments in which forwarding is based on network addresses, the routing information in FIB 108 typically includes address prefixes where each address prefix is associated with information (e.g. a pointer) that references a TLU data structure indicating the next hop for that address. In embodiments in which forwarding is based on MPLS labels, the routing information in FIB 108 typically includes MPLS labels where each label is associated with information that indicates the next hop in the LSP for that label.

In some embodiments, PLU memory 106 may be M-trie memory that stores address prefixes as one or more data structures organized as trees, where each tree may comprise a root node, one or more intermediate nodes, and one or more leaf nodes. In these embodiments, a look-up of an address prefix in the M-trie memory would return a pointer and/or other information that is stored in a leaf node of the tree. In other embodiments, PLU memory 106 may be fast Static RAM (SRAM) or Dynamic RAM (DRAM) memory in which the routing information of FIB 108 is stored as tables containing multiple entries; in these embodiments, a look-up may use an address prefix and/or other information as index into the FIB tables. In yet other embodiments, PLU memory 106 may be a TCAM memory which, when executed to perform a look-up, would take an address prefix and/or other information as input and would return a pointer or other information that is programmed therein. (A TCAM memory unit is an integrated circuit that stores a set of entries and includes internal logic which, when executed, is operable to receive a set of bits applied to the input of the unit and to return to the output of the unit the first entry that matches the input bits; a TCAM provides for variable-length input by allowing each input bit to have the values of "0", "1", or "don't care", where no matching is attempted for "don't care" input bits.) The techniques for VPN fast convergence and two-level load-balancing provided herein are not limited to being implemented by using any particular type of PLU memory, and for this reason the examples of PLU memory described herein are to be regarded in an illustrative rather than a restrictive sense.

TLU memory 110 stores adjacency information that is organized as adjacency tables 112. Nodes in a network are said to be adjacent if they can reach each other with a single hop across a data link layer. The adjacency information stored in adjacency tables 112 includes adjacency entries for all address prefixes stored in PLU memory 106. As referred to herein, an adjacency entry is a set of information in an adjacency table that identifies an outgoing communication interface connected to an adjacent network infrastructure element. According to the techniques for VPN fast convergence and two-level load balancing in MPLS network described herein, a typical adjacency entry includes an IGP label indicating an LSP through the network and an adjacency identifier, associated with the IGP label, that identifies a particular outgoing interface of the router in which line card 100 is operating.

Similarly to PLU memory 106, in some embodiments TLU memory 110 may be M-trie memory that stores the adjacency information of adjacency tables 112 as one or more data structures that are organized as trees. In other embodiments, TLU memory 110 may be SRAM or DRAM memory in which the adjacency information is stored as tables containing multiple entries. Thus, the techniques for VPN fast convergence and two-level load-balancing provided herein are not limited to being implemented by using any particular type of TLU memory, and for this reason the examples of TLU memory described herein are to be regarded in an illustrative rather than a restrictive sense.

PLU memory 106 and TLU memory 110 are operatively connected to memory storage logic 116. Logic 116 is operable to program PLU memory 106 and TLU memory 110. As used herein, "programming" a portion of memory (for example, PLU memory 106 or TLU memory 110) refers to the process of storing information into the portion of memory and maintaining the stored information consistent with other information that may be stored in other portions of memory. For example, logic 116 is operable to program PLU memory 106 and TLU memory 110 in a manner in which each entry in PLU memory 106 includes a pointer to a valid entry in TLU memory 110. In one embodiment, logic 116 initializes FIB 108 and adjacency tables 112 when line card 100 is first configured and made operable. Thereafter, logic 116 maintains the information in FIB 108 consistent with the information in adjacency tables 112.

According to the techniques for VPN fast convergence and two-level load-balancing in MPLS networks, logic 116 populates adjacency tables 112 as adjacent network nodes (e.g. routers) are discovered. Each time an adjacent node is discovered and associated with an IGP label, logic 116 creates an adjacency entry in adjacency tables 112. Once a route for an LSP is computed (either by the route processor of the router or by a route processor, if any, of the line card), logic 116 stores the address prefix for the route along with any other information (e.g. VPN labels and/or unique identifiers) as an entry in PLU memory 106. Logic 116 then includes information (e.g. a pointer) in the PLU entry that references the corresponding adjacency entry in adjacency tables 112. In embodiments that implement MPLS load-balancing, logic 116 is also operable to initialize and maintain the necessary load-balancing entries in the memory portions allocated for the entries.

In various embodiments, logic 116 may be implemented as a set of ASICs, as one or more stored sequences of instructions that are executable by one or more processors as software programs, or as any combination of software and hardware components. The techniques for VPN fast convergence and two-level load-balancing in MPLS networks are not limited to any particular type of logic for programming the utilized memory portions, and for this reason the example of memory storage logic described above is to be considered in an illustrative rather than a restrictive sense.

While FIG. 1 illustrates an example line card that may be used in distributed router architectures (such as the Cisco 12000 Series routers) to implement the techniques for VPN fast convergence and two-level load-balancing in MPLS networks, the techniques described herein are not limited to being implemented by any particular components in any particular apparatus or device. For example, the techniques described herein may be implemented in routers or switches with multiple inbound and outgoing interfaces by using hardware components, software components, or any combination of hardware and software components. An example of a system in which the techniques described herein may be implemented by using software components is provided in FIG. 6, which is described in a separate section hereinafter. For this reason, any embodiments described herein as implementing the techniques for VPN fast convergence and two-level load balancing in MPLS networks are to be regarded in an illustrative rather than a restrictive sense.

3.0 VPN Fast Convergence in MPLS Networks 3.1 Overview of MPLS VPNs

MPLS VPNs are described in *RFC*2547, which was published by IETF in March 1999, and which is hereby incorporated by reference for all purposes as if fully set forth herein. In one operational context, Service Providers (SP) or operators of Autonomous Systems (AS) may provide VPNs by using MPLS protocols to forward packets across the SP or AS networks. In general, a VPN is a set of sites, each comprising one or more networks, that are interconnected over a backbone network that is typically administered by an SP or an operator of an AS. The operators or owners of the set of sites are typically the customers which rely on the SP for connectivity to each other and/or to the Internet; examples of such customers include, but are not limited to, educational institutions, business corporations, and governmental institutions.

In a typical operational context, a Customer Edge (CE) device (such as a router established at the edge of a customer network) is connected over a communication link (such as PPP, ATM, Ethernet, Frame Relay, etc.) to a Provider Edge (PE) device (such as an ingress router established on the edge of the SP backbone network). The SP backbone network includes PE routers, as well as other intermediate routers (typically labeled as "P" routers) that are not connected to CE devices. An ingress or egress PE router is attached to a particular customer VPN if the PE router is attached to, and is a routing peer of, a CE router that participates in the particular VPN. Each ingress PE router in an SP network maintains separate per-site Virtual Routing Forwarding (VRF) tables in its FIB, that is, each site (e.g. a customer network) to which the ingress PE router is connected to via a CE router is typically mapped to a separate VRF table. When the ingress PE router receives a packet from a particular CE router of a particular site, the VRF table associated with that particular site is inspected in order to determine how to route the packet. The VRF table associated with the particular site is populated only with routes that lead to other sites that participate in at least one VPN in which the particular site also participates. (This prevents communication between sites that do not participate in any common VPNs). The routes stored in the VRF tables of ingress PE routers may be distributed in an SP network over one or more protocols, the typical example being the Multi-Protocol Border Gateway Protocol (MP-BGP), which is described in *RFC*2858 that was published by IETF in June 2000.

In the VRF tables maintained at an ingress PE router, different VPNs are identified and distinguished from each other by using VPN identifiers. In one example operational context, VPNs may be established over IPv4 networks. In this operational context, a VPN identifier is typically a 12-byte value that represents a VPN-IPv4 network address, where the first 8 bytes store a Route Distinguisher (RD) value and the last 4 bytes store an IPv4 network address. The purpose of the RD value is to allow for the creation of distinct VPN routes to the same IPv4 address prefix, and typically different VPNs are associated with different RD values.

In order to provide MPLS forwarding for VPN traffic, the PE routers in an SP backbone network typically distribute their network addresses (e.g. address prefixes with a "/32" mask) to the IGP routing tables of the intermediate routers in the backbone network. This enables the label distribution mechanisms that support MPLS forwarding to assign, at each intermediate router, an IGP label corresponding to the IGP route to each PE router. The path through the network that is identified by the sequence of IGP labels from an ingress PE router, through zero or more intermediate routers, to an egress PE router represents an LSP from the ingress PE router to the egress PE router. In order to support VPN traffic over MPLS, each ingress PE router also assigns a VPN label to each VPN that it supports, where the VPN label identifying a particular VPN may be based on the RD value and/or the particular address prefix for that VPN.

In operation, packets are forwarded from one VPN site to another VPN site over an SP backbone network by prepending the packets with two-level MPLS label stacks at the ingress PE router at which the packets enter the network. Specifically, when a packet is received at the ingress PE router, the ingress PE router determines, based on its FIB and its adjacency tables, an IGP label and a VPN label for the packet. The ingress PE router then creates and appends (prepends) to the packet a two-level label stack. The top portion (level) of the label stack stores the IGP label which identifies the next hop router in the LSP path to the egress router at which the packet is to exit the backbone network. The bottom (level) of the label stack stores the VPN label which identifies, to the egress router, the particular VPN in which the packet travels. When the next hop router receives the packet, next hop router uses the IGP label at the top of the label stack to determine the address of the next hop router for that particular IGP label and a new IGP label that identifies the router at the next hop in the LSP for the packet. The top IGP label in the label stack is then swapped with the new IGP label, and the packet is forwarded to the router at the next hop in the LSP. Each next hop router forwards the packet in a similar manner until the packet reaches the egress PE router. When the egress PE router receives the packet, the egress PE router strips the IGP label from the label stack and retrieves the VPN label that is stored at the bottom of the label stack. (If penultimate hop popping is used, the egress PE router would just retrieve the VPN label that would be stored at top portion of the label stack when the packet is received.) The egress PE router then uses the VPN label as an index into the forwarding tables in its FIB to determine the next hop CE router of the destination VPN site to which the packet needs to be forwarded, pops the label stack from the packet, and forwards the packet accordingly.

3.2 MPLS Forwarding by Using MPLS Rewrites

According to one approach, MPLS forwarding for VPN traffic is supported at an ingress router by programming the PLU memory and the TLU memory of the router to support a particular forwarding resolution chain, which minimizes the number of memory accesses that need to be performed by the forwarding components in order to make a forwarding decision. In one embodiment according to this approach, the information in the adjacency tables in TLU memory is organized in entries, where each entry is a data structure that stores: an IGP label indicating a particular next hop for a particular LSP; a VPN label identifying a particular VPN reachable over the network; and an adjacency identifier that identifies an outgoing interface that is connected to the router at the next hop identified by the IGP label. Thus, MPLS label stack information (an IGP label and a VPN label) and an adjacency identifier are collapsed into a single memory data structure, which is referred herein as an "MPLS rewrite". The forwarding information of the FIB tables is stored in the PLU memory as entries, where each entry stores an address destination prefix and a pointer to a particular MPLS rewrite. By collapsing MPLS information and the adjacency information in a single MPLS rewrite in TLU memory, this approach minimizes the number of memory accesses that are needed by the forwarding components to make a forwarding decision.

Figure 2:
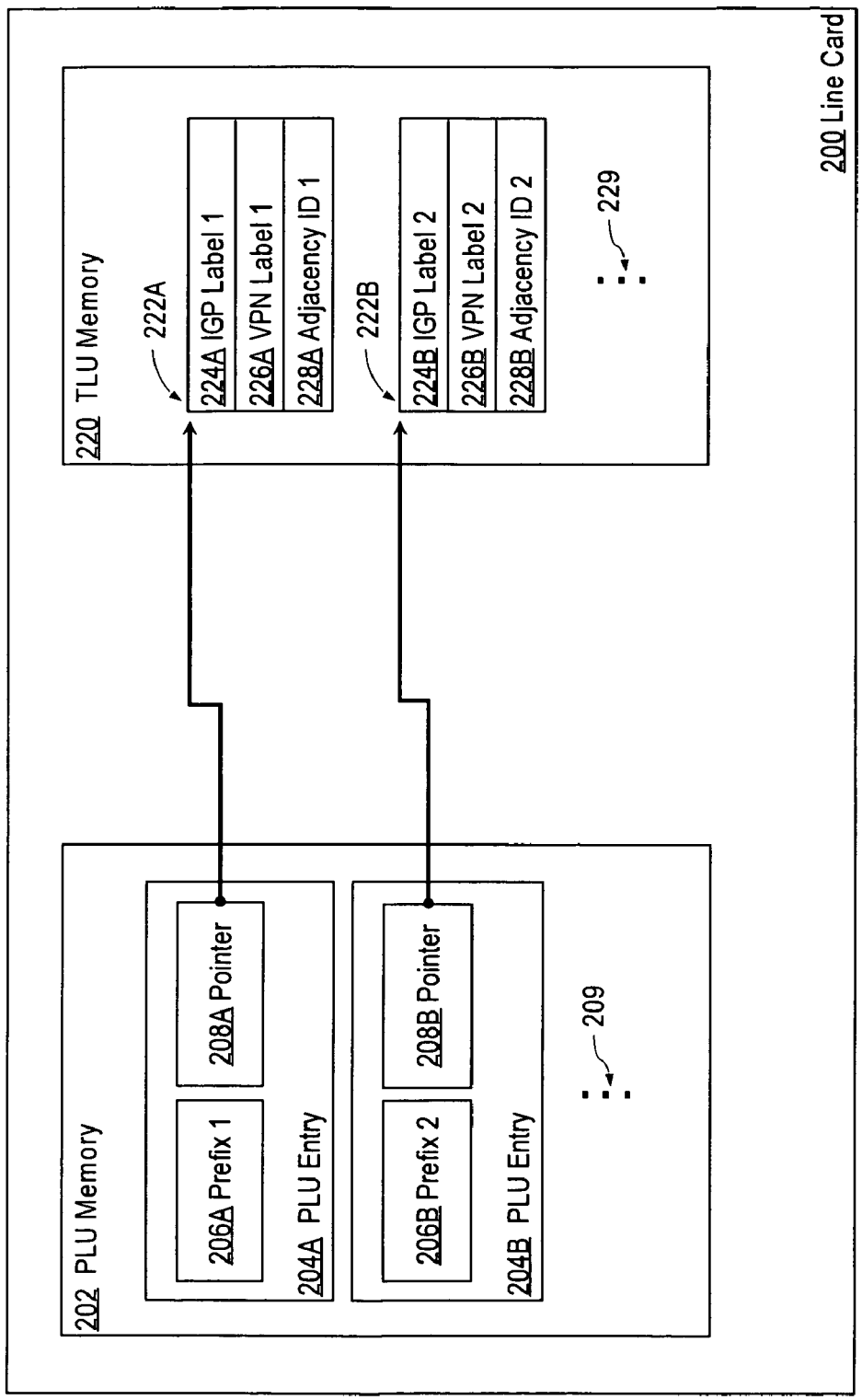
FIG. 2 is a block diagram that illustrates line card memory data structures for storing MPLS forwarding information for VPN traffic.

The PLU memory and TLU memory data structures used according to this approach, as well as examples of information stored therein, are illustrated in FIG. 2. In FIG. 2, line card 200 includes PLU memory 202 and TLU memory 220. (For illustration purposes, the other components of line card 200, including the forwarding components that make forwarding decisions based on the information in PLU memory 202 and TLU memory 220, are not shown.)

As depicted in FIG. 2, TLU memory 220 is programmed with MPLS rewrites 222A and 222B. (Ellipsis 229 indicates that TLU memory 220 may be programmed with any number of other adjacency entries, including other MPLS rewrites.) MPLS rewrite 222A stores IGP label 224A, VPN label 226A, and adjacency identifier 228A. Similarly, MPLS rewrite 222B stores a different IGP label 224B, a different VPN label 226B, and a different adjacency identifier 228B. PLU memory 202 is programmed with PLU entries 204A and 204B. (Ellipsis 209 indicates that PLU memory 202 may include other PLU entries.) PLU entry 204A stores address prefix 206A and rewrite pointer 208A, which points to MPLS rewrite 222A. PLU entry 204B stores a different address prefix 206B and a different rewrite pointer 208B, which points to MPLS rewrite 222B. (For illustration purposes only, the PLU entries depicted in FIG. 2 are shown to store address prefixes and rewrite pointers as separate fields. It is noted however, that in some implementations the PLU memory may be an M-trie memory, in which the PLU memory would be organized as a tree, where each leaf node of the tree would store a pointer to a TLU entry and the values stored in the nodes on the path from the leaf node to the root node of the tree would combine to represent an address prefix associated with that pointer.)

In operation, when a packet is received at line card 200, the forwarding components (not shown in FIG. 2) of line card 200 retrieve the destination address from the packet and perform a memory access to lookup the address in PLU memory 202. Suppose that the address from the packet matches the address prefix in a particular entry, for example address prefix 206A in PLU entry 204A. Based on the rewrite pointer 208A in the matching PLU entry 204A, the forwarding components then accesses MPLS rewrite 222A in TLU 220, and retrieves IGP label 224A, VPN label 226A, and adjacency identifier 228A. The forwarding components then create and append an MPLS label for the packet from the retrieved IGP label and VPN label, and thereafter forward the packet to the outgoing router interface that is indicated by the retrieved adjacency identifier.

While in the above approach the collapsing of the MPLS label stack information with the associated adjacency identifier allows the forwarding (hardware and/or software) components to minimize the memory accesses needed to make a forwarding decision, the approach does not scale well if a large number of address prefixes need to be stored in the PLU memory. For example, the above approach does not scale well since it results in the TLU memory needing to store a number of MPLS rewrites that is of same order of magnitude as the number of address prefixes that need to be programmed in the PLU memory, which may be over 500,000 for ingress routers in busy SP networks. In addition, the above approach of collapsing MPLS label stack information with adjacency identifiers does not exhibit good route convergence for LSP (and thus VPN) routes when an IGP path in the network flaps.

If an IGP path between any two routers in the network flaps, then an ingress router needs to update all MPLS rewrites in its TLU memory that store an IGP label indicating an LSP over the flapped IGP path. However, since the fast SRAM memory in a router is typically limited, a large number of MPLS rewrites would need to be stored in slower SDRAM; thus, when an IGP path flaps, a large number of MPLS rewrites would need to be updated in slower memory which would cause a drop in the forwarding performance of the ingress router.

3.3 MPLS Forwarding for VPN Fast Convergence

In order to provide an improvement over the above approach, techniques are described in this section that achieve better scaling and better VPN route convergence by programming the PLU memory of an ingress router to store VPN labels along with their associated address prefixes in the PLU entries. In addition to a VPN label and an address prefix, a PLU entry also stores a pointer to a data structure in TLU memory. Each data structure, or adjacency entry, in TLU memory stores an IGP label and an adjacency identifier that identifies an outgoing interface through which the IGP path indicated by the IGP label can be reached.

Figure 3A:
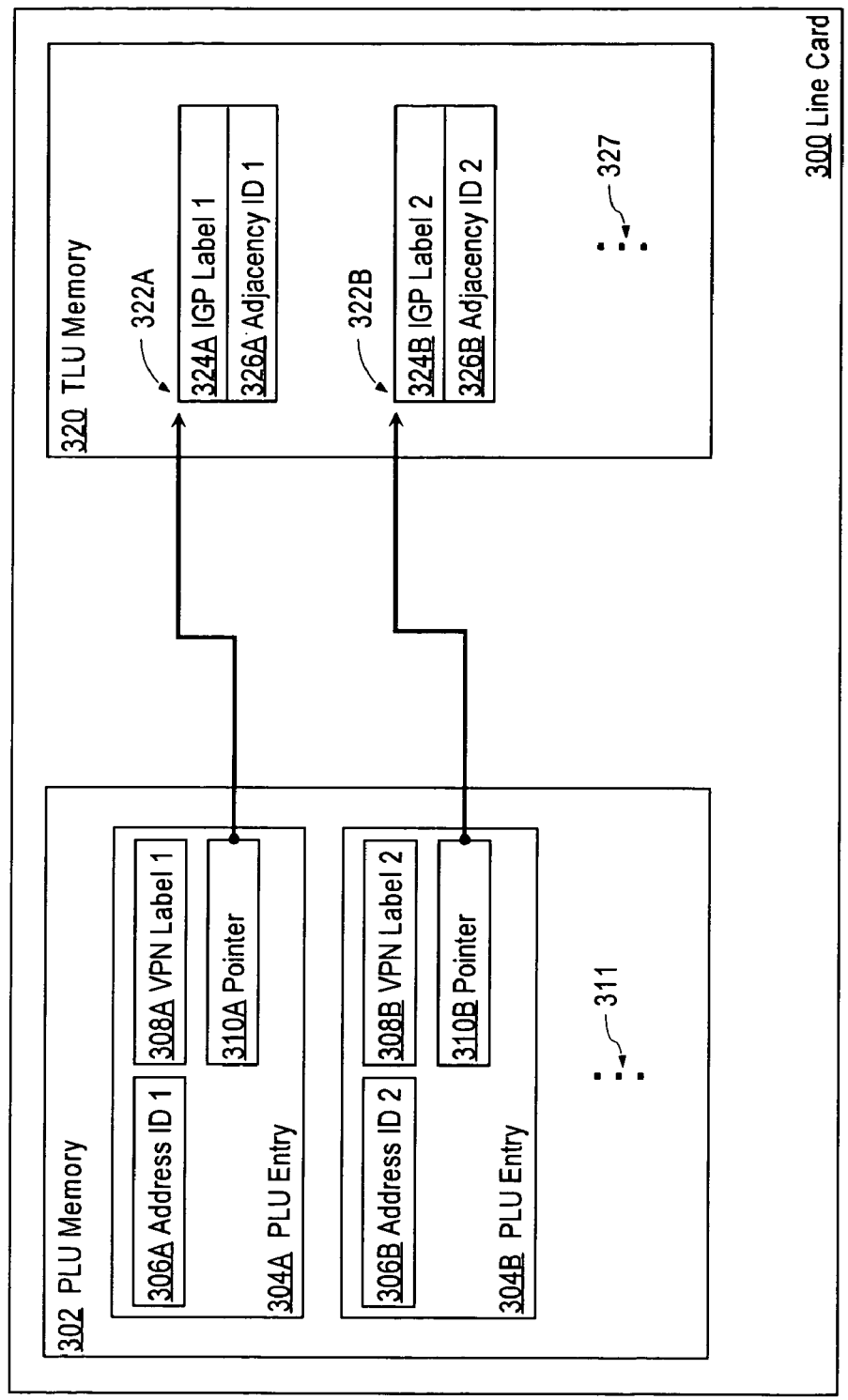
FIG. 3A is a block diagram that illustrates line card memory data structures for storing MPLS forwarding information for VPN traffic according to one embodiment.

Illustrated in FIG. 3A is a line card 300 with PLU memory that is programmed with entries that store VPN labels along with their associated address prefixes, and TLU memory that is programmed with adjacency entries that store IGP labels and their associated adjacency identifiers. Line card 300 includes PLU memory 302 and TLU memory 320. For illustration purposes, the other components of line card 300, including the (software and/or hardware) forwarding components that make forwarding decisions based on the information in PLU memory 302 and TLU memory 320, are not shown. Also for purely illustration purposes, the PLU entries depicted in FIG. 3A are shown to store address prefixes, VPN labels, and TLU pointers as separate fields. It is noted however, that in some implementations the PLU memory may be an M-trie memory that is organized as a tree, where each leaf node of the tree would store a VPN label and a pointer to a TLU entry and where the values stored in the nodes on the path from the leaf node to the root node of the tree would combine to represent an address prefix associated with that VPN label and that TLU pointer.

As illustrated in FIG. 3A, TLU memory 320 is programmed with adjacency entries 322A and 322B. (Ellipsis 327 indicates that TLU memory 320 may be programmed with any number of other adjacency entries.) Adjacency entry 322A stores IGP label 324A and adjacency identifier 326A. Similarly, adjacency entry 322B stores a different IGP label 324B and a different adjacency identifier 326B. PLU memory 302 is programmed with PLU entries 304A and 304B. (Ellipsis 311 indicates that PLU memory 302 may include any number of other PLU entries.) PLU entry 304A stores address prefix 306A and VPN label 308A, which identifies a VPN that is associated with address prefix 306A. PLU entry 304A also stores pointer 310A, which points to adjacency entry 322A. PLU entry 304B stores a different address prefix 306B and a different VPN label 308B, which identifies a different VPN that is reachable through address prefix 306B. PLU entry 304B also stores pointer 310B, which points to adjacency entry 322B.

In one embodiment, when a packet is received at line card 300, a forwarding ASIC (not shown in FIG. 3A) of line card 300 retrieves the destination address from the packet. (In other embodiments, the forwarding component of the line card may comprise one or more processors and one or more stored sequences of instructions, such as, for example, software programs, that are operable to perform the same functionalities as the forwarding ASIC.)

After retrieving the destination address from the packet, the forwarding ASIC performs a memory access to lookup the destination address in PLU memory 302. Suppose that the destination address of the packet matches the address prefix in a particular PLU entry, for example address prefix 306A in PLU entry 304A. The forwarding ASIC retrieves VPN label 308A from the matching PLU entry 304A and determines that the received packet belongs to a particular VPN that is associated with the retrieved VPN label. Based on the TLU pointer 310A in the matching PLU entry 304A, the forwarding ASIC then locates and accesses adjacency entry 322A in TLU 220. The forwarding ASIC retrieves IGP label 324A and adjacency identifier 326A. Based on adjacency identifier 326A, the forwarding ASIC determines the outgoing interface (of the ingress router in which line card 300 is installed and is operating) on which the received packet needs to be transmitted. The forwarding ASIC then creates and appends (prepends) to the packet a two-level MPLS label stack, where IGP label 324A is stored at the top of the label stack and VPN label 308A is stored at the bottom of the label stack. The forwarding ASIC then sends (or causes one or more other components of line card 300 to send) the packet to the outgoing interface identified by adjacency identifier 326A, and thereafter the packet is transmitted through the outgoing interface to the router at the next hop in the IGP path that is indicated by IGP label 324A.

The technique for storing VPN labels in PLU memory described in this section achieves better scaling. The number of adjacency entries programmed in the TLU memory would be at most equal to the number of IGP paths in the network on which the ingress router can forward traffic; in a busy SP network, this number would be in the single thousands which is about two orders of magnitude smaller than the number of address prefixes on which the ingress router would typically forward traffic. The technique for storing VPN labels in PLU memory also achieves better route convergence for VPN routes. When an IGP path in the SP network flaps, an in-place update is performed in TLU memory to update only those relatively few TLU entries that are affected. While providing better scaling and fast VPN route convergence, the technique described in this section still allows a forwarding component, such as a forwarding ASIC, to perform a minimum number of memory accesses before making a forwarding decision for any particular packet. In a router that can perform two memory accesses at a line card packet-receiving rate, such as the Cisco 12000 Series routers, this technique allows a line card operating in the router to forward packets at or above the maximum rate at which packets can be received.

3.4 VPN Fast Convergence with MPLS Load-Balancing

In one embodiment, the technique for fast convergence of VPN routes described in the previous section may be modified to provide load-balancing for VPN traffic. As referred to herein, "load-balancing" refers to a mechanism in which for each received packet a router dynamically selects a path from a plurality of paths that lead to the same network destination.

In this embodiment, MPLS load-balancing is provided for VPN traffic by programming and maintaining in memory a plurality of IGP load-balancing entries. In this embodiment, a PLU memory in a line card of an ingress router is programmed to store PLU entries, where each PLU entry stores an address prefix, a VPN label indicating a particular VPN that is associated with the address prefix, and a pointer to a specific IGP load-balancing entry. An IGP load-balancing entry is a data structure that stores two or more reference values, or pointers, to two or more corresponding adjacency entries in TLU memory, where the two or more corresponding adjacency entries indicate two or more separate IGP paths through the network that lead to the same egress router. Each adjacency entry in TLU memory, which is pointed to by a reference value in an IGP load-balancing entry, stores an IGP label and an adjacency identifier that identifies an outgoing interface through which the IGP path indicated by the IGP label can be reached.

Figure 3B:
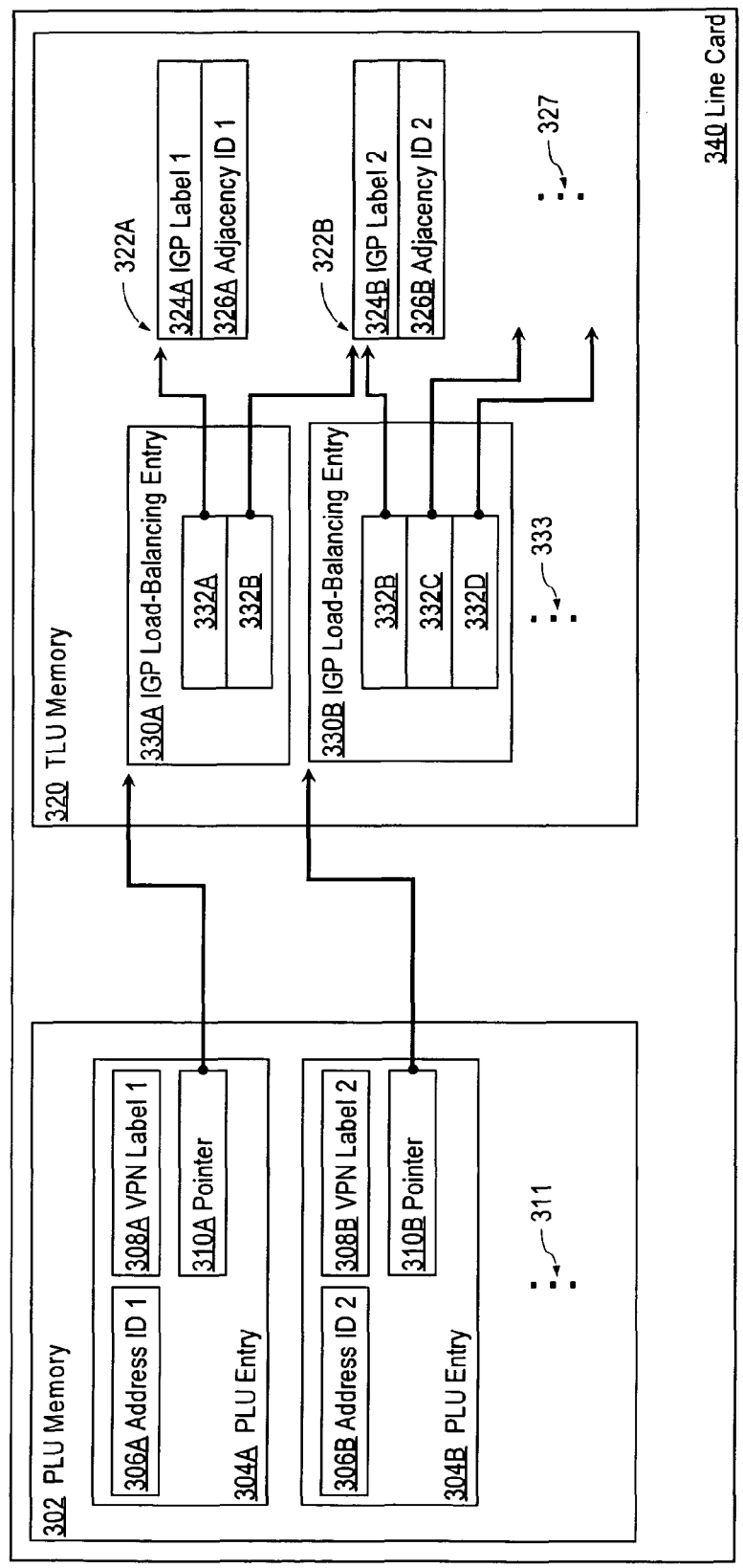
FIG. 3B is a block diagram that illustrates line card memory data structures for storing MPLS forwarding information for VPN traffic according to an embodiment that implements load-balancing.

Illustrated in FIG. 3B is a line card 340 with PLU memory that is programmed with entries that store VPN labels along with their associated address prefixes, and TLU memory that is programmed with a plurality of IGP load-balancing entries and a plurality of adjacency entries that store IGP labels and their associated adjacency identifiers. For purely illustration purposes, the PLU entries depicted in FIG. 3B are shown to store address prefixes, VPN labels, and load-balancing pointers as separate fields. It is noted however, that in some implementations the PLU memory may be an M-trie memory that is organized as a tree, where each leaf node of the tree would store a VPN label and a pointer to an IGP load-balancing entry and where the values stored in the nodes on the path from the leaf node to the root node of the tree would combine to represent an address prefix associated with that VPN label and that pointer.

Also for illustration purposes, the IGP load-balancing entries are depicted in FIG. 3B as part of the TLU memory. It is noted however that even for busy SP networks, the number of IGP load-balancing entries that would need to be stored in an ingress router is relative small; thus, in some embodiments the IGP load-balancing entries may be programmed in fast memory (for example, SRAM memory or TCAM) that may be separate from the TLU memory. For this reason, the embodiment depicted in FIG. 3B in which the IGP load-balancing entries are programmed in TLU memory is to be regarded in an illustrative rather than a restrictive sense.

As illustrated in FIG. 3B, TLU memory 320 is programmed with adjacency entries 322A and 322B, which indicate two separate IGP paths through the network that lead to the same egress router. (Ellipsis 327 indicates that TLU memory 320 may be programmed with any number of other adjacency entries that may indicate IGP paths to the same and/or different egress router.) Adjacency entry 322A stores IGP label 324A and adjacency identifier 326A. Similarly, adjacency entry 322B stores a different IGP label 324B and a different adjacency identifier 326B.

TLU memory 320 is also programmed with IGP load-balancing entries 330A and 330B. (Ellipsis 333 indicates that TLU memory 320 may be programmed with any number of other IGP load-balancing entries.) Load-balancing entry 330A stores reference values (or pointers) 332A and 332B, which point to adjacency entries 322A and 322B, respectively. Load-balancing entry 330B stores reference values (or pointers) 332B, 332C, and 332D, where reference value 332B points to adjacency entry 322B and reference values 322C and 322D point to adjacency entries in TLU memory 320 that are not depicted in FIG. 3B. (It is noted that the techniques for MPLS load-balancing described herein are not limited to storing any particular number of reference values in an IGP load-balancing entry.)

PLU memory 302 is programmed with PLU entries 304A and 304B. (Ellipsis 311 indicates that PLU memory 302 may include any number of other PLU entries.) PLU entry 304A stores address prefix 306A and VPN label 308A, which identifies a VPN that is associated with address prefix 306A. PLU entry 304A also stores pointer 310A, which points to load-balancing entry 330A. PLU entry 304B stores a different address prefix 306B and a different VPN label 308B, which identifies a different VPN that is associated with address prefix 306B. PLU entry 304B also stores pointer 310B, which points to IGP load-balancing entry 330B. In some embodiments, there may be more than one VPN label associated with a particular address prefix. For example, a particular address prefix may be the destination address for packets sent to multiple VPN sites. In these embodiments, at the time an address prefix is programmed in a PLU entry, a hash value may be computed based on the address prefix. The hash value may then be used to select one of the multiple VPN labels associated with the address prefix, and the selected VPN label is then stored in the PLU entry for that address prefix.

In one embodiment, when a packet is received at line card 340, a forwarding ASIC (not shown in FIG. 3B) of line card 340 retrieves the source and destination addresses from the packet. (In other embodiments, the forwarding component of the line card may comprise one or more processors and one or more stored sequences of instructions, such as, for example, software programs, that are operable to perform the same functionalities as the forwarding ASIC.)

After retrieving the destination address from the packet, the forwarding ASIC performs a memory access to lookup the destination address in PLU memory 302. Suppose that the destination address of the packet matches the address prefix in a particular PLU entry, for example address prefix 306B in PLU entry 304B. The forwarding ASIC retrieves VPN label 308B from the matching PLU entry 304B and determines that the received packet belongs to a particular VPN that is associated with the retrieved VPN label. The forwarding ASIC then uses pointer 310B in the matching PLU entry 304B to select and access IGP load-balancing entry 330B (which is pointed to by pointer 310B). The forwarding ASIC computes a hash value based on the source address and the destination address that are retrieved from the packet; based on the computed hash value, the forwarding ASIC selects one particular pointer from the pointers stored in IGP load-balancing entry 330B, for example pointer (or reference value) 332B. Since line card 340 performs hashing into a load-balancing entry (which indicates several IGP paths that lead to the same egress router) for each packet that it receives, the line card effectively balances the network traffic that it forwards into the network over all IGP paths that are available to the egress router. (Instead of a hashing operation, some embodiments may use other algorithms or mechanism for selecting an adjacency entry pointer from a plurality of available pointers that are stored in an IGP load-balancing entry; the MPLS load-balancing technique described in this section is not restricted to any particular algorithm or mechanism for selecting an adjacency entry pointer from an IGP load-balancing entry).

Based on the selected reference value 332B, the forwarding ASIC then locates and accesses adjacency entry 322B in TLU memory 320. The forwarding ASIC retrieves IGP label 324B and adjacency identifier 326B. Based on adjacency identifier 326B, the forwarding ASIC determines the outgoing interface (of the ingress router in which line card 340 is installed and is operating) on which the received packet needs to be transmitted. The forwarding ASIC then creates and appends (prepends) to the packet a two-level MPLS label stack, where IGP label 324B is stored at the top of the label stack and VPN label 308B is stored at the bottom of the label stack. The forwarding ASIC then sends (or causes one or more other components of line card 340 to send) the packet to the outgoing interface identified by adjacency identifier 326B, and thereafter the packet is transmitted through the outgoing interface to the router at the next hop in the IGP path that is indicated by IGP label 324B.

The technique for MPLS load-balancing of VPN traffic described in this section provide for fast VPN route convergence. When an IGP path in a network flaps, an in-place memory update is performed to update only those relatively few IGP load-balancing entries that include pointers to the adjacency entry indicating (through the IGP label stored therein) the IGP path that flapped. Thus, when an IGP path flaps only the IGP load-balancing entries need to be modified which provides for fast route convergence. In some embodiments implemented in a router or a line card thereof, the forwarding performance can be improved even further when the IGP load-balancing entries are programmed into fast memory, such as, for example, SRAM or TCAM. Further, the MPLS load-balancing technique described in this section still allows a forwarding component, such as a forwarding ASIC, to perform a minimum number of memory accesses before making a forwarding decision for any particular packet, which in turn allows the router or line card to operate at or above the maximum packet-receiving rate.

4.0 Two-Level Load-Balancing for Non-VPN Traffic in MPLS Networks 4.1 Overview of MPLS Forwarding for non-VPN Traffic In some embodiments, MPLS forwarding may be used to transport, from one edge of a network to another, non-VPN network traffic that conforms to a variety of protocols. Examples of such protocols include, but are not limited to, IPv4, IPv6, Frame Relay, Ethernet, and Asynchronous Transfer Mode (ATM). In these embodiments, the destination address prefix of an inbound packet received at an ingress router is associated with the BGP next hop for the packet, where the BGP next hop is the address of an egress router at which the packet exits the network. The ingress router receives the BGP next hop address from the egress router over a BGP session, and stores the BGP next hop address in one or more routing tables. In the routing tables, a BGP next hop address is typically associated with an IGP label, which indicates an LSP to the router at the next hop and, ultimately, leads to the egress router.

In some operational contexts, there may exist two or more egress routers through which a packet (which is received at an ingress router of a network) may be transmitted to its destination. For example, in some SP networks, there may be multiple egress PE routers that are peering with one or more CE routers in a customer network. Each of the multiple egress PE routers is configured to forward packets to the same address destination to (or through) the customer network via any of the CE routers. For the purposes of MPLS forwarding, each egress PE router also establishes LSPs to the ingress PE routers for particular destination address prefixes and distributes to the ingress routers its network address as the BGP next hop address for these destinations. (In other words, an ingress PE router may "learn" the same destination address prefix from multiple egress PE routers.) As a result, at an ingress PE router there may exist more than one LSP to more than one egress PE router for any particular destination address prefix for which the ingress PE router is configured to provide MPLS forwarding.

In addition to multiple BGP next hops, in these operational contexts there typically are multiple IGP paths through the network from any given ingress router to any given egress router. Thus, for any particular packet to a particular destination address prefix that is received at an ingress router, it is possible for the ingress router to perform two-level load-balancing, where one level of load-balancing is performed with the respect to the available BGP next hops (i.e. the available egress routers) for that destination address prefix and a second level of load-balancing is performed with respect to the IGP paths to the particular BGP next hop (i.e. egress router) that is selected for the particular packet. Two-level load-balancing is desirable in MPLS networks at least in order to avoid network congestion and to improve the overall throughput in the networks.

The challenge in providing such two-level load-balancing in MPLS networks is for ingress routers to make forwarding decisions at same or higher rate at which packets are received by the routers. To address this challenge, the next section describes techniques for true two-level load-balancing for non-VPN traffic in MPLS networks. When implemented at an ingress router, these techniques provide for MPLS forwarding with BGP next hop load-balancing and IGP path load-balancing with a minimal number of memory accesses, which allows the ingress router (or any line cards thereof) to forward packets at or above the maximum packet-receiving rate for the router (or the line cards thereof.)

4.2 Two-Level Load Balancing for Non-VPN Traffic

In one embodiment, two-level load-balancing with respect to BGP next hops and IGP paths is provided for non-VPN traffic by programming and maintaining in memory a plurality of BGP load-balancing entries and a plurality of IGP load-balancing entries. In this embodiment, a PLU memory in a line card of an ingress router is programmed to store PLU entries, where each PLU entry stores an address prefix and a unique value that is used for selecting a BGP load-balancing entry from the plurality of BGP load-balancing entries. The unique value stored in a PLU entry is associated with two or more of the plurality of BGP load-balancing entries, where the associated two or more BGP load-balancing entries indicate two or more egress routers that are configured to forward packets out of the network to the same destination address prefix. A BGP load-balancing entry is a data structure that stores an index value and a pointer to one of the plurality of IGP load-balancing entries, where the index value is used for looking up its associated pointer. An IGP load-balancing entry is a data structure that stores two or more reference values, or pointers, to two or more corresponding adjacency entries in TLU memory, where the two or more corresponding adjacency entries indicate two or more separate IGP paths through the network that lead to the same egress router. Each adjacency entry in TLU memory, which is pointed to by a reference value in an IGP load-balancing entry, stores an IGP label and an adjacency identifier that identifies an outgoing interface through which the IGP path indicated by the IGP label can be reached.

Figure 4:
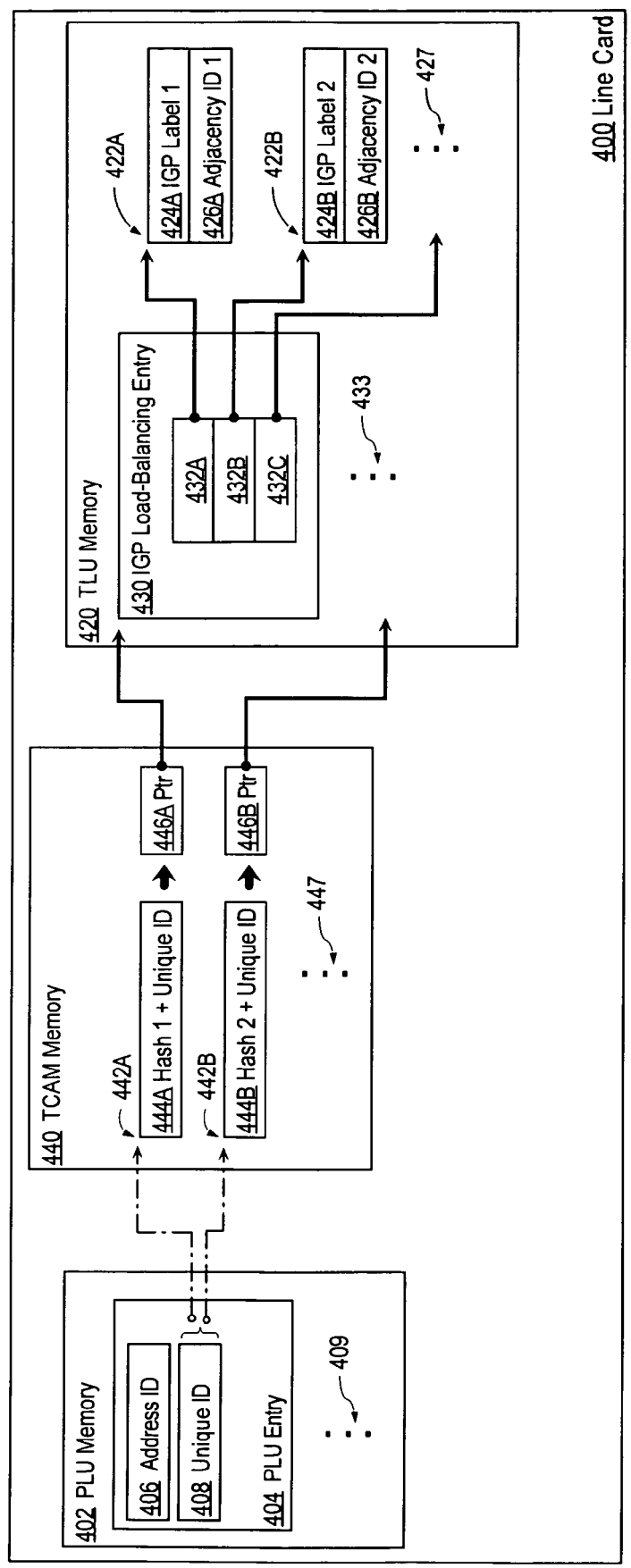
FIG. 4 is a block diagram that illustrates line card memory data structures for storing MPLS forwarding information in an embodiment that implements two-level load-balancing for non-VPN traffic.

Illustrated in FIG. 4 is a line card 400 with PLU memory that is programmed with entries that store unique values along with their associated address prefixes, a TCAM memory that is programmed with BGP load-balancing entries, and TLU memory that is programmed with a plurality of IGP load-balancing entries and a plurality of adjacency entries that store IGP labels and their associated adjacency identifiers.

For illustration purposes, FIG. 4 depicts the BGP load-balancing entries as programmed in TCAM memory, where the index value of each BGP load-balancing entry is used for matching to the TCAM input bits, and the pointer to an IGP load-balancing entry is the output value returned when the TCAM is executed with the index value as an input. It is noted however, that in some implementations the memory storing the BGP load-balancing entries may be an M-trie memory that is organized as a tree, where each leaf node of the tree would store a pointer to an IGP load-balancing entry and where the values stored in the nodes on the path from the leaf node to the root node of the tree would combine to represent the index value associated with that pointer. In other embodiments, the memory storing the BGP load-balancing entries may be organized as a table, where each BGP load-balancing entry is a record that stores in separate fields an index value and its associated pointer to an IGP load-balancing entry. Thus, the techniques for two-level load-balancing described herein are not limited to any particular type of memory or any particular type of storage organization for the BGP load-balancing entries.

Also for illustration purposes, the PLU entries depicted in FIG. 4 are shown to store address prefixes and unique values as separate fields. It is noted however, that in some implementations the PLU memory may be an M-trie memory that is organized as a tree, where each leaf node of the tree would store the unique value and where the values stored in the nodes on the path from the leaf node to the root node of the tree would combine to represent an address prefix associated with that unique value. For illustration purposes, the IGP load-balancing entries are depicted in FIG. 4 as part of the TLU memory. It is noted however that even for busy SP networks, the number of IGP load-balancing entries that would need to be stored in an ingress router is relative small; thus, in some embodiments the IGP load-balancing entries may be programmed in fast memory (for example, SRAM memory or TCAM) that may be separate from the TLU memory. For this reason, the embodiment depicted in FIG. 4 in which the IGP load-balancing entries are programmed in TLU memory is to be regarded in an illustrative rather than a restrictive sense.

As illustrated in FIG. 4, TLU memory 420 is programmed with adjacency entries 422A and 422B, which indicate two separate IGP paths through the network that lead to the same egress router. (Ellipsis 427 indicates that TLU memory 420 may be programmed with any number of other adjacency entries that may indicate IGP paths to the same and/or different egress routers.) Adjacency entry 422A stores IGP label 424A and adjacency identifier 426A. Similarly, adjacency entry 422B stores a different IGP label 424B and a different adjacency identifier 426B.

TLU memory 420 is also programmed with a plurality of IGP load-balancing entries as indicated by ellipsis 433, which plurality includes IGP load-balancing entry 430. Load-balancing entry 430 stores reference values (or pointers) 432A, 432B, and 432C, where reference value 432A points to adjacency entry 422A, reference value 432B points to adjacency entry 422B, and reference value 422C points to an adjacency entry in TLU memory 420 that is not depicted in FIG. 4. All the adjacency entries pointed to by any of reference values 432A, 432B, and 432C indicate different IGP paths to the same egress router in the network. (It is noted that the techniques for two-level load-balancing described herein are not limited to storing any particular number of reference values in an IGP load-balancing entry.)

TCAM memory 440 is programmed with a plurality of BGP load-balancing entries as indicated by ellipsis 447, which plurality includes BGP load-balancing entries 442A and 442B. BGP load-balancing entry 442A stores index value 444A that is associated with pointer 446A, which indicates a particular LSP by pointing to IGP load-balancing entry 430. Index value 444A is a composite value that is derived from a pre-computed hash value and from a unique value that is stored in a PLU entry. Similarly, BGP load-balancing entry 442B stores index value 444B that is associated with pointer 446B, which indicates a different LSP by pointing an IGP load-balancing entry that is not shown in FIG. 4. Index value 444B is a composite value that is derived from a different pre-computed hash value and from the same unique value on which index value 444A is based. According to the techniques described herein, BGP next hop load-balancing is achieved by selecting one of the two LSPs indicated by BGP load-balancing entries 442A and 442B based on computing one of two different hash values on which index values 444A and 444B are based. A hash value for a received packet is computed based on the source and destination addresses in the packet. The computed hash value is combined with a unique value from a PLU entry and is used as an input to perform a TCAM look-up, which returns that one pointer from pointers 446A and 446B which is associated with the combination of the inputted unique value and computed hash value. While FIG. 4 depicts only two BGP load-balancing entries that are associated with the same unique value from a PLU entry, the techniques for two-level load-balancing described herein are not so limited; the number of BGP load-balancing entries that may be associated with the same unique value reflects the number of egress routers (e.g. BGP next hops) in the network that are configured to forward traffic out of the network to the same destination address prefix.

PLU memory 402 is programmed with a plurality of PLU entries as indicated by ellipsis 409, which plurality includes PLU entry 404. PLU entry 404 stores address prefix 406 and unique value 408, which is associated with BGP load-balancing entries 442A and 442B. In combination with a hash value computed on a per-packet basis, unique value 408 is used as the input to perform a look-up in TCAM memory 440 to select a BGP load-balancing entry from the plurality of BGP load-balancing entries included therein.

In one embodiment, when a packet is received at line card 400, a forwarding ASIC (not shown in FIG. 4) of line card 400 retrieves the source and destination addresses from the packet. (In other embodiments, the forwarding component of the line card may comprise one or more processors and one or more stored sequences of instructions, such as, for example, software programs, that are operable to perform the same functionalities as the forwarding ASIC.)

After retrieving the destination address from the packet, the forwarding ASIC performs a memory access to lookup the destination address in PLU memory 402. Suppose that the destination address of the packet matches to the address prefix in a particular PLU entry, for example address prefix 406 in PLU entry 404. The forwarding ASIC retrieves unique value 408 from PLU entry 404. The forwarding ASIC computes a hash value based on the source address and the destination address that are retrieved from the received packet. The forwarding ASIC sets the input bits of TCAM memory 440 to the combined value of the unique value 408 and the computed hash value, sets the "don't care" bits of TCAM memory 440 as necessary, and executes the TCAM to select one of the BGP load-balancing entries programmed therein. In this way, by using a hashing operation to determine the input to TCAM memory 440, the forwarding ASIC selects one of the plurality of BGP load-balancing entries in TCAM memory 440. Since line card 400 performs hashing into the plurality of BGP load-balancing entries for each packet that it receives, the line card effectively balances the network traffic that it forwards into the network over all egress routers (e.g. BGP next hops) that are available to forward traffic to the same destination address prefix. (Instead of a hashing operation, some embodiments may use other algorithms or mechanisms for selecting a BGP load-balancing entry from a plurality of available BGP load-balancing entries; the two-level load-balancing technique described in this section is not restricted to any particular algorithm or mechanism for selecting a BGP load-balancing entry).

When executed, TCAM memory 440 matches on its input bits and returns a pointer to an IGP load-balancing entry, for example, pointer 446A which references IGP load-balancing entry 430. The forwarding ASIC then uses the hash value previously computed based on the received packet's source and destination addresses to hash into IGP load-balancing entry 430 in order to select an adjacency entry. By using the hashing operation, the forwarding ASIC randomly selects one particular pointer from the pointers stored in IGP load-balancing entry 430, for example pointer (or reference value) 432B. Since line card 400 performs hashing into a load-balancing entry (which indicates several IGP paths that lead to the same egress router) for each packet that it receives, the line card effectively balances the network traffic that it forwards into the network over all IGP paths that are available to the egress router.

Based on the selected reference value 432B, the forwarding ASIC then locates and accesses adjacency entry 422B in TLU memory 420. The forwarding ASIC retrieves IGP label 424B and adjacency identifier 426B. Based on adjacency identifier 426B, the forwarding ASIC determines the outgoing interface (of the ingress router in which line card 400 is installed and is operating) on which the received packet needs to be transmitted. The forwarding ASIC then creates and appends (prepends) to the packet a single-level MPLS label stack, where IGP label 424B is stored at the top of the label stack. The forwarding ASIC then sends (or causes one or more other components of line card 400 to send) the packet to the outgoing interface identified by adjacency identifier 426B, and thereafter the packet is transmitted through the outgoing interface to the router at the next hop in the IGP path that is indicated by IGP label 424B.

In addition to providing two-level load-balancing for non-VPN traffic, the technique described in this section also provides for fast BGP and IGP route convergence. When an IGP path in the network flaps, an in-place memory update is performed to update only those relatively few IGP load-balancing entries that include pointers to the adjacency entry indicating (through the IGP label stored therein) the IGP path that flapped. Thus, the route convergence when an IGP path flaps is independent from any BGP next hop address prefixes, and only IGP load-balancing entries need to be modified which provides for fast route convergence. When a BGP path in the network flaps (for example, when an ingress router learns the same BGP next hop address prefix from two egress routers and one of these egress routers later goes down), then the BGP load-balancing entry associated with the egress router is simply removed from the memory portion that stores the BGP load-balancing entries. Thus, the route convergence upon a BGP path flap is reduced to removing a single entry from memory, which is typically very fast regardless of the type of memory used. In some embodiments implemented in a router or a line card thereof, the forwarding performance can be improved even further when the BGP load-balancing entries and the IGP load-balancing entries are programmed into fast memory, such as, for example, SRAM or TCAM. Further, the two-level load-balancing technique for non-VPN MPLS traffic described in this section still allows a forwarding component, such as a forwarding ASIC, to perform a minimum number of memory accesses before making a forwarding decision for any particular packet, which in turn allows the router or line card to operate at or above the maximum packet-receiving rate.

5.0 Two-Level Load-Balancing for VPN Traffic in MPLS Networks 5.1 Overview of Multi-Path VPNs In some operational contexts that provide MPLS forwarding for VPN traffic, multi-path VPNs may be configured at an ingress router. From the perspective of an ingress router at the edge of a particular network, a multi-path VPN includes a destination VPN site that is reachable through two or more egress routers established at the edge of the particular network. Typically, the ingress router would learn the address prefix of the same destination VPN site from two or more different egress routers; each egress router would distribute to the ingress router: (1) over an LDP protocol, a VPN label that the egress router uses to identify the destination VPN site, and (2) over a BGP protocol, the network address of the egress router as the BGP next hop address for network traffic sent to the destination VPN site. Thus, an ingress router would receive two or more VPN labels that are associated with the address prefix of the same destination VPN site, where the two or more VPN labels indicate two or more different egress routers capable of forwarding traffic out of the particular network to the destination VPN site. The routing tables of the ingress router would also store, for each particular egress router of the two or more egress routers, the BGP next hop address of that particular egress router in association with at least one IGP label, which indicates an LSP to the router at the next hop and, ultimately, leads to that particular egress router.

For example, in some SP networks, there may be multiple egress PE routers that are peering with one or more CE routers that are part of the same VPN site in a customer network. Each of the multiple egress PE routers is configured to forward packets to (or through) the VPN site of the customer network via any of the CE routers. As a result, at an ingress PE router the address prefix of the VPN site may be associated with multiple LSPs. When the ingress router receives a packet that is sent to the VPN site, the ingress router can select to forward the packet within the SP network to any of the multiple egress routers over the corresponding LSP.

In addition to multiple BGP next hops indicating multiple LSPs, in these operational contexts there typically are multiple IGP paths through the network from any given ingress router to any given egress router. Thus, for any particular packet to an address prefix of a multi-path VPN site that is received at an ingress router, it is possible for the ingress router to perform two-level load-balancing, where one level of load-balancing is performed with the respect to the available LSPs (i.e. the available BGP next hops indicating the available egress routers) for the address prefix of the multi-path VPN site and another level of load-balancing is performed with respect to the IGP paths to the particular BGP next hop (i.e. the particular egress router) that is selected for the particular packet.

Similarly to the two-level load-balancing for non-VPN traffic, the challenge in providing two-level load-balancing for VPN traffic in MPLS networks is for ingress routers to make forwarding decisions at same or higher rate at which packets are received by the routers. To address this challenge, the next section describes techniques for two-level load-balancing of VPN traffic in MPLS networks. When implemented at an ingress router, these techniques provide for MPLS forwarding with BGP next hop load-balancing and IGP path load-balancing with a minimal number of memory accesses, which allows the ingress router (or any line cards thereof) to forward packets at or above the maximum packet-receiving rate for the router (or the line cards thereof.)

5.2 Two-Level Load-Balancing for Multi-Path VPNs

In one embodiment, two-level load-balancing with respect to VPN LSPs and IGP paths is provided for VPN traffic by programming and maintaining in memory a plurality of VPN load-balancing entries and a plurality of IGP load-balancing entries. In this embodiment, a PLU memory in a line card of an ingress router is programmed to store PLU entries, where each PLU entry stores an address prefix, a unique value that is associated with two or more VPN load-balancing entries, and an array of two or more VPN labels that indicate two or more LSPs for the same VPN that is associated with the address prefix. Each entry of the array of the two or more VPN labels includes a path index value that is used as a key to select an associated VPN label. The unique value stored in a PLU entry is associated with two or more of the plurality of VPN load-balancing entries, where the associated two or more VPN load-balancing entries indicate two or more egress routers that are configured to forward packets out of the network to the same VPN site. A VPN load-balancing entry is a data structure that stores an index value and an associated pair of a path index value and a pointer to one of the plurality of IGP load-balancing entries, where the index value is used for looking up its associated pointer and path index value. An IGP load-balancing entry is a data structure that stores two or more reference values, or pointers, to two or more corresponding adjacency entries in TLU memory, where the two or more corresponding adjacency entries indicate two or more separate IGP paths through the network that lead to the same egress router. Each adjacency entry in TLU memory, which is pointed to by a reference value in an IGP load-balancing entry, stores an IGP label and an adjacency identifier that identifies an outgoing interface through which the IGP path indicated by the IGP label can be reached.

Figure 5:
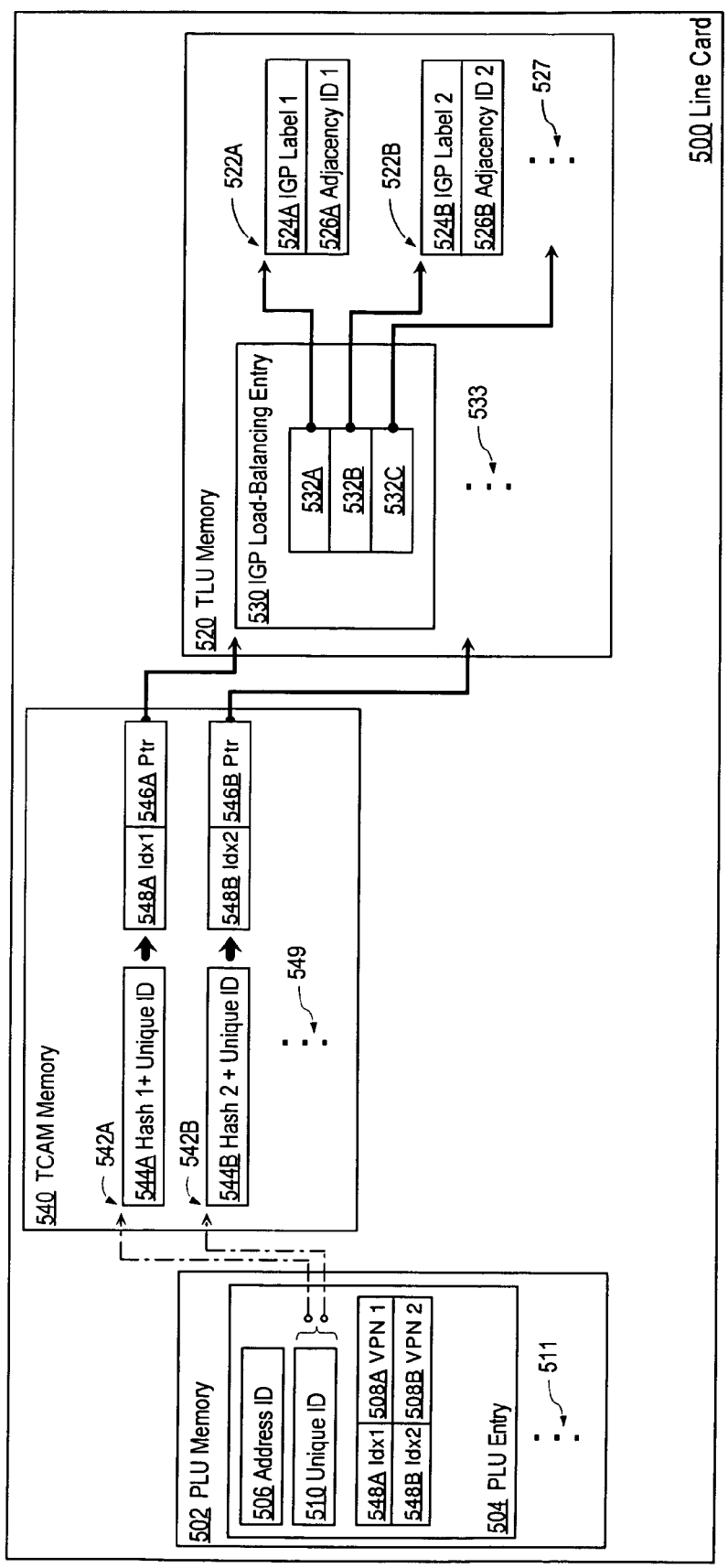
FIG. 5 is a block diagram that illustrates line care memory structures for storing MPLS forwarding information in an embodiment that implements two-level load-balancing for VPN traffic.

Illustrated in FIG. 5 is a line card 500 with PLU memory that is programmed with PLU entries, where each PLU entry stores an address prefix, a unique value, and an array of two or more VPN labels that indicate the same VPN which is associated with the address prefix stored in the entry. Line card 500 also includes TCAM memory that is programmed with a plurality of VPN load-balancing entries, and TLU memory that is programmed with a plurality of IGP load-balancing entries and a plurality of adjacency entries that store IGP labels and their associated adjacency identifiers.

For illustration purposes, FIG. 5 depicts the VPN load-balancing entries as programmed in TCAM memory, where the index value of each VPN load-balancing entry is used for matching to the TCAM input bits, and the associated pair of a path index value and a pointer to an IGP load-balancing entry is the output value returned when the TCAM is executed with the index value as an input. It is noted however, that in some embodiments the memory storing the VPN load-balancing entries may be an M-trie memory that is organized as a tree, where each leaf node of the tree would store a pair of a path index value and a pointer to an IGP load-balancing entry and where the values stored in the nodes on the path from the leaf node to the root node of the tree would combine to represent the index value associated with that pointer. In other embodiments, the memory storing the VPN load-balancing entries may be organized as a table, where each VPN load-balancing entry is a record that stores in separate fields an index value, the associated path index value, and the associated pointer to an IGP load-balancing entry. Thus, the techniques for two-level load-balancing described herein are not limited to any particular type of memory or any particular type of storage organization for the VPN load-balancing entries.

Also for illustration purposes, the PLU entries depicted in FIG. 5 are shown to store address prefixes, arrays of VPN labels, and unique values as separate fields. It is noted however, that in some embodiments the PLU memory may be an M-trie memory that is organized as a tree, where each leaf node of the tree would store an unique value and the array of VPN labels, and where the values stored in the nodes on the path from the leaf node to the root node of the tree would combine to represent an address prefix associated with that unique value and array of VPN labels. For illustration purposes, the IGP load-balancing entries are depicted in FIG. 5 as part of the TLU memory. It is noted however that even for busy SP networks, the number of IGP load-balancing entries that would need to be stored in an ingress router is relative small; thus, in some embodiments the IGP load-balancing entries may be programmed in fast memory (for example, SRAM memory or TCAM) that may be separate from the TLU memory. For this reason, the embodiment depicted in FIG. 5 in which the IGP load-balancing entries are programmed in TLU memory is to be regarded in an illustrative rather than a restrictive sense.

As illustrated in FIG. 5, TLU memory 520 is programmed with adjacency entries 522A and 522B, which indicate two separate IGP paths through the network that lead to the same egress router. (Ellipsis 527 indicates that TLU memory 520 may be programmed with any number of other adjacency entries that may indicate IGP paths to the same and/or different egress routers.) Adjacency entry 522A stores IGP label 524A and adjacency identifier 526A. Similarly, adjacency entry 522B stores a different IGP label 524B and a different adjacency identifier 526B.

TLU memory 520 is also programmed with a plurality of IGP load-balancing entries as indicated by ellipsis 533, which plurality includes IGP load-balancing entry 530. Load-balancing entry 530 stores reference values (or pointers) 532A, 532B, and 532C, where reference value 532A points to adjacency entry 522A, reference value 532B points to adjacency entry 522B, and reference value 522C points to an adjacency entry in TLU memory 520 that is not depicted in FIG. 5. All the adjacency entries pointed to by any of reference values 532A, 532B, and 532C indicate different IGP paths to the same egress router in the network. (It is noted that the techniques for two-level load-balancing described herein are not limited to storing any particular number of reference values in an IGP load-balancing entry; the number of reference value stored in a particular IGP load-balancing entry may reflect the number of IGP paths available to a particular egress router.)

TCAM memory 540 is programmed with a plurality of VPN load-balancing entries as indicated by ellipsis 549, which plurality includes VPN load-balancing entries 542A and 542B. VPN load-balancing entry 542A stores index value 544A that is associated with pointer 546A and path index value 548A. Pointer 546A indicates a particular LSP by pointing to IGP load-balancing entry 530, and path index value 548A indicates a particular. VPN label that is associated with an address prefix that is reachable on that particular LSP. Index value 544A is a composite value that is derived from a pre-computed hash value and from a unique value, which unique value is stored in a PLU entry and is associated with an address prefix. Similarly, VPN load-balancing entry 542B stores index value 544B that is associated with pointer 546B and path index value 548B. Pointer 546B indicates a different LSP by pointing to an IGP load-balancing entry that is not shown in FIG. 5, and path index value 548B indicates a different VPN label that is associated with an address prefix that is reachable on the different LSP. Index value 544B is a composite value that is derived from a different pre-computed hash value and from the same unique value on which index value 544A is based.

According to the techniques described herein, VPN load-balancing is achieved by selecting one of the LSPs indicated by VPN load-balancing entries 542A and 542B based on computing one of the different hash values on which index values 544A and 544B are based. A hash value for a received packet is computed based on the source and destination addresses in the packet. The computed hash value is combined with a unique value from the corresponding PLU entry and is used as an input to perform a TCAM look-up, which returns that one pointer from pointers 546A and 546B which is associated with the inputted computed hash value and unique value. The TCAM also returns the path index value that is associated with the returned pointer, where the path index value is used to select the VPN label that is imposed on the received packet. While FIG. 5 depicts only two VPN load-balancing entries that are associated with the same unique value from a PLU entry, the techniques for two-level load-balancing of VPN traffic described herein are not so limited; the set of VPN load-balancing entries that may be associated with the same unique value reflects the number of egress routers (e.g. BGP next hops) in the network that are configured to forward traffic out of the network to the same destination VPN site.

PLU memory 502 is programmed with a plurality of PLU entries as indicated by ellipsis 511, which plurality includes PLU entry 504. PLU entry 504 stores address prefix 506 and an array that includes VPN labels 508A and 508B, both of which identify the same VPN that is associated with address prefix 506. PLU entry 504 also stores unique value 510, which is associated with VPN load-balancing entries 542A and 542B. In combination with a hash value that is computed for a received packet based on the source and destination addresses in the packet, unique value 510 is used as the input for a look-up in TCAM memory 540 to select a VPN load-balancing entry that includes a pointer to an IGP load-balancing entry. The embodiment depicted in FIG. 5 illustrates a PLU entry that includes an array that stores two VPN labels. However, the techniques for two-level load-balancing of VPN traffic described herein are not so limited. For example, in embodiments in which a PLU entry is large enough, the PLU entry may include an array that stores three or more VPN labels. In another example, in some embodiments an address prefix stored in a PLU entry may be associated with two or more VPN labels. In these embodiments, the PLU entry may include an array that stores at least one VPN label, and the rest of the VPN labels may be stored in a continuation of the array that is programmed in another portion of memory. In some embodiments, the number of VPN labels that indicate the same destination VPN associated with an address prefix may reflect the number of egress routers (e.g. BGP next hops) in the network that are configured to forward traffic out of the network to that same destination VPN site. Thus, the structures of PLU memory 502 depicted in FIG. 5 are to be regarded in an illustrative rather than a restrictive sense.

In one embodiment, when a packet is received at line card 500, a forwarding ASIC (not shown in FIG. 5) of line card 500 retrieves the source address and the destination address from the packet. (In other embodiments, the forwarding component of the line card may comprise one or more processors and one or more stored sequences of instructions, such as, for example, software programs, that are operable to perform the same functionalities as the forwarding ASIC.)

After retrieving the destination address from the packet, the forwarding ASIC performs a memory access to lookup the destination address in PLU memory 502. Suppose that the destination address of the packet matches to the address prefix in a particular PLU entry, for example address prefix 506 in PLU entry 504. The forwarding ASIC retrieves the information from PLU entry 504, including unique value 510 and the array that stores VPN labels 508A and 508B with their associated path index values 548A and 548B. The forwarding ASIC then computes a hash value for the received packet based on the source and destination addresses retrieved from the packet. (In some embodiments, the forwarding ASIC may compute the hash value based on any information or parameter that is associated with the received packet, such as, for example, the sequence number of the packet if the packet is an IP packet. The two-level load-balancing technique for VPN traffic described in this section is not restricted to any particular algorithm or mechanism for computing a hash value for a received packet.) The forwarding ASIC then sets the input bits of TCAM memory 540 to the combined value of the unique value 510 and the computed hash value, sets the "don't care" bits of TCAM memory 540 as necessary, and executes the TCAM to select one of the VPN load-balancing entries stored therein. In this way, by computing a hash value for the received packet, the forwarding ASIC randomly selects one of the plurality of VPN load-balancing entries in TCAM memory 540. Since line card 500 performs hashing into the plurality of VPN load-balancing entries for each packet that it receives, the line card effectively balances the network traffic that it forwards into the network over all egress routers (e.g. BGP next hops) that are available to forward traffic to the same destination VPN site.

When executed, TCAM memory 540 matches on its input bits and returns a pointer to an IGP load-balancing entry, for example, pointer 546A which references IGP load-balancing entry 530. The TCAM memory 540 also returns the path index value 548A that is associated with pointer 546A. The forwarding ASIC uses path index value 548A to select the VPN label that needs to be imposed on the received packet. For example, the forwarding ASIC uses path index value 548A to search the array of VPN labels included in PLU entry 504, and determines that the VPN label to be imposed on the packet is VPN label 508A. (In embodiments in which the array of VPN labels associated with a PLU entry is continued in another memory portion, the forwarding ASIC may use the path index value returned from the TCM memory to search that other memory portion in order to retrieve the VPN label that needs to be imposed on the packet.) The forwarding ASIC uses pointer 546A to access the selected IGP load-balancing entry 530. The forwarding ASIC then uses the hash value previously computed based on the received packet's source and destination addresses to hash into IGP load-balancing entry 530 in order to select an adjacency entry. By using a hashing operation, the forwarding ASIC randomly selects one particular pointer from the pointers stored in IGP load-balancing entry 530, for example pointer (or reference value) 532B that references adjacency entry 522B. Since line card 500 performs hashing into a load-balancing entry (which indicates several IGP paths that lead to the same egress router) for each received packet, the line card effectively balances the network traffic that it forwards into the network over all IGP paths that are available to an egress router.

Based on the selected reference value 532B, the forwarding ASIC then locates and accesses adjacency entry 522B in TLU memory 520. The forwarding ASIC retrieves IGP label 524B and adjacency identifier 526B. Based on adjacency identifier 526B, the forwarding ASIC determines the outgoing interface (of the ingress router in which line card 500 is installed and is operating) on which the received packet needs to be transmitted. The forwarding ASIC then creates and appends (prepends) to the packet a two-level MPLS label stack, where IGP label 524B is stored at the top of the label stack and the already selected VPN label 508A is stored at the bottom of the label stack. The forwarding ASIC then sends (or causes one or more other components of line card 500 to send) the packet to the outgoing interface identified by adjacency identifier 526B, and thereafter the packet is transmitted through the outgoing interface to the router at the next hop in the IGP path that is indicated by IGP label 524B.

In addition to providing two-level load-balancing for VPN traffic, the technique described in this section also provides for fast VPN route and IGP route convergence. The number of VPN load-balancing entries reflects the number of unique sets of IGP load-balancing entries that can be used to forward VPN traffic. Typically, the number of unique sets of IGP load-balancing entries is equal to the number of unique combinations of egress routers from which an ingress router can learn VPN address prefixes that are associated with VPN sites. The number of such unique combinations of egress routers, however, is independent of the number of VPN address prefixes. In a busy SP network, the number of VPN address prefixes forwarded upon by an ingress router may be in the order of 500K to 1 million, while the number of unique combinations of egress routers would typically be in the order of 100 to a maximum of 1000. Thus, the technique for two-level load-balancing of VPN traffic described herein provides for excellent scale with respect to the amount of routing information that needs to be programmed and maintained in an ingress router that supports MPLS forwarding.

Further, according to the technique for two-level load-balancing of VPN traffic described herein, when an IGP path in the network flaps, an in-place memory update is performed to update only those relatively few IGP load-balancing entries that include pointers to the adjacency entry indicating (through the IGP label stored therein) the IGP path that flapped. Thus, the route convergence when an IGP path flaps is independent from the number of VPN address prefixes maintained and forwarded upon by an ingress router, which provides for fast IGP route convergence. When a BGP path in the network flaps (for example, when an egress router from which a VPN prefix is learned goes down), the VPN load-balancing entry associated with that egress router may be removed from the memory portion that stores the VPN load-balancing entries. Thus, the route convergence upon a BGP path flap is reduced to removing a single entry from memory, which is typically very fast regardless of the type of memory used.

In some embodiments implemented in a router or a line card thereof, the forwarding performance can be improved even further when the VPN load-balancing entries and the IGP load-balancing entries are programmed into fast memory, such as, for example, SRAM or TCAM. Further, the two-level load-balancing technique for VPN traffic described in this section still allows a forwarding component, such as a forwarding ASIC, to perform a minimum number of memory accesses before making a forwarding decision for any particular packet, which in turn allows the router or line card to operate at or above the maximum packet-receiving rate.

6.0 Alternative Features and Alternatives Embodiments

In one embodiment, the techniques for VPN fast convergence and two-level load-balancing in MPLS networks described herein may be implemented in an ingress PE router that is established at the edge of an SP network. In this embodiment, the ingress PE router may be connected to, and route peering with, one or more CE routers that are established in one or more customer networks. The ingress PE router may be configured to receive VPN and/or non-VPN traffic from the CE routers and to forward the traffic across the SP network while implementing the techniques for fast VPN route convergence and two-level MPLS load-balancing described herein. In some embodiments, an ingress PE router may have a distributed architecture (such as the Cisco 12000 Series routers); in these embodiments, the forwarding of packets according to the techniques described herein may be implemented by one or more line cards that are installed and operate in the router. In other embodiments, the ingress PE router may not use separate line cards but may instead implement the techniques described herein by using hardware components, software components, or any combination of hardware and software components. In other embodiments, the techniques for fast VPN route convergence and two-level load-balancing in MPLS networks described herein may be implemented by other network elements, such as, for example, switches and load-balancers, that may or may not have a distributed architecture and/or separate line cards. Thus, the techniques for fast VPN route convergence and two-level load-balancing in MPLS networks described herein are not restricted to being implemented on any particular type of network infrastructure element.

In some embodiments, the packets entering a network at an ingress router, which implements the techniques for fast VPN route convergence and two-level load-balancing in MPLS networks described herein, may be IP packets that carry an IP destination address. In other embodiments, the techniques described herein may be implemented for MPLS traffic that is received from adjacent networks. For example, the packets entering an SP network at an ingress PE router may be received from a CE router and may be labeled with an MPLS label that has been negotiated and is known to the CE router, the ingress PE router, and the corresponding egress PE router to indicate a particular LSP through the SP network. In these embodiments, PLU entries in the PLU memory are programmed with the negotiated MPLS labels instead of address prefixes. When the ingress PE router receives from a CE router a packet that is labeled with an MPLS label, the ingress PE router makes a forwarding decision for such a packet by looking up the MPLS label of the received packet in PLU memory. When the egress router eventually receives the packet, the egress PE router uses the same MPLS label (which is still attached to the packet) as an index into a table in order to determine the next hop CE router to which the packet needs to be sent as the packet exits the SP network.

In some embodiments, network infrastructure elements may implement the techniques for fast VPN route convergence and two-level MPLS load-balancing described herein for Layer 3 network packets that are received over a Layer 3 network protocol at the network element. Examples of such network packets include, but are not limited to, IPv4 and IPv6 packets that may be received over IPv4 and IPv6 network protocols. In other embodiments, network infrastructure elements may implement the techniques described herein for Layer 2 datagrams or data link frames that are sent over a Layer 2 protocol, for example, Frame Relay, Ethernet, or ATM. Examples of such datagrams include, but are not limited to, FR cells, Ethernet data link frames, and ATM cells. Thus, the techniques for fast VPN route convergence and two-level MPLS load-balancing described herein may be implemented for any type of network protocol that provides datagrams which may be forwarded in a network over an MPLS protocol.

7.0 Hardware Overview for a Software Forwarding Embodiment

Figure 6:
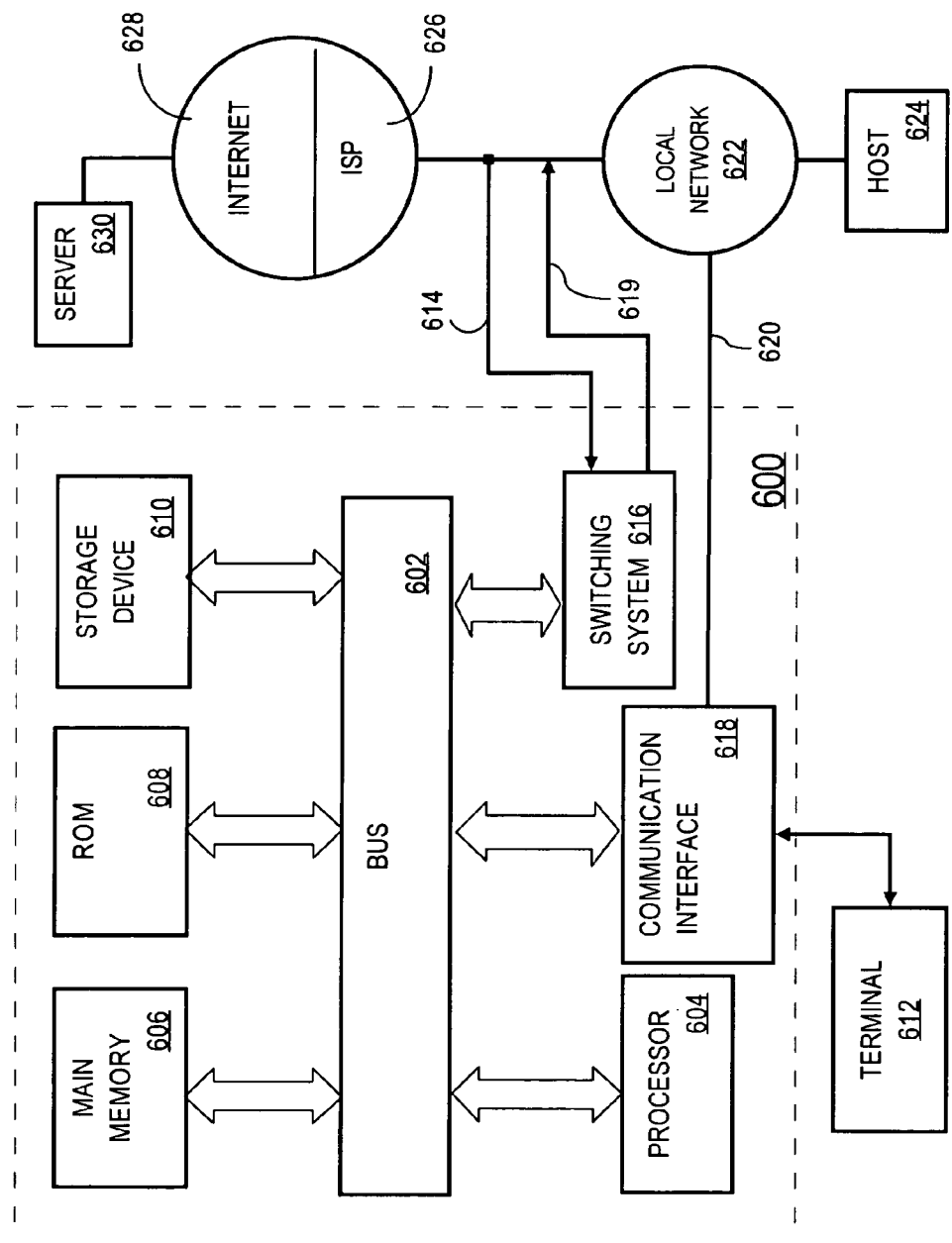
FIG. 6 is a block diagram that illustrates a computer system upon which embodiments that use software forwarding may be implemented.

FIG. 6 is a block diagram that illustrates a computer system 600 upon which embodiments may be implemented. In these embodiment, the described techniques for VPN fast convergence and two-level load-balancing in MPLS networks may be implemented using one or more software programs running on a network element such as a router device. Thus, in these embodiments, the computer system 600 is a router.

Computer system 600 includes a bus 602 or other communication mechanism for communicating information, and a processor 604 coupled with bus 602 for processing information. Computer system 600 also includes a main memory 606, such as a random access memory (RAM), flash memory, or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, flash memory or optical disk, is provided and coupled to bus 602 for storing information and instructions.

A communication interface 618 may be coupled to bus 602 for communicating information and command selections to processor 604. Interface 618 is a conventional serial interface such as an RS-232 or RS-422 interface. An external terminal 612 or other computer system connects to the computer system 600 and provides commands to it using the interface 614. Firmware or software running in the computer system 600 provides a terminal interface or character-based command interface so that external commands can be given to the computer system.

A switching system 616 is coupled to bus 602 and has an input interface 614 and an output interface 619 to one or more external network elements. The external network elements may include a local network 622 coupled to one or more hosts 624, or a global network such as Internet 628 having one or more servers 630. The switching system 616 switches information traffic arriving on input interface 614 to output interface 619 according to pre-determined protocols and conventions that are well known. For example, switching system 616, in cooperation with processor 604, can determine a destination of a packet of data arriving on input interface 614 and send it to the correct destination using output interface 619. The destinations may include host 624, server 630, other end stations, or other routing and switching devices in local network 622 or Internet 628.

The invention is related to the use of computer system 600 for VPN fast convergence and two-level load-balancing in MPLS networks. According to one embodiment of the invention, VPN fast convergence and two-level load-balancing are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Communication interface 618 also provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for VPN fast convergence and two-level load-balancing in MPLS networks as described herein.

The received code may be executed by processor 604 as it is received, and/or stored in storage device 610, or other non-volatile storage for later execution. In this manner, computer system 600 may obtain application code in the form of a carrier wave.

8.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
a first memory portion comprising a plurality of first data structures, wherein each of the plurality of first data structures includes an Internal Gateway Protocol (IGP) label and an adjacency identifier that identifies one of a plurality of outgoing interfaces associated with the apparatus, wherein each IGP label indicates a Label Switched Path (LSP) through a network,
wherein the first memory portion is a Table-Look-Up (TLU) memory and the plurality of first data structures is a plurality of TLU entries,
wherein each of the plurality of first data structures does not include any Virtual Private Network (VPN) label that identifies any VPN that is reachable over the network;
a second memory portion comprising a plurality of IGP load-balancing entries, wherein each of the plurality of IGP load-balancing entries includes two or more reference values that point to two or more of the plurality of first data structures in the first memory portion;
a third memory portion comprising a plurality of second data structures, wherein each of the plurality of second data structures includes a network address identifier, a VPN label associated with the network address identifier, and a pointer that indicates one of the plurality of first data structures in the first memory portion, wherein each VPN label identifies a VPN that is reachable over the network,
wherein the network address identifier includes a Multi-Protocol Label Switching (MPLS) label,
wherein the third memory portion is a Pointer-Look-Up (PLU) memory and the plurality of second data structures is a plurality of PLU entries,
wherein a hash value is computed based on the network address identifier to select one of multiple VPN labels associated with the network address identifier and the selected VPN label is stored in a PLU entry among the plurality of PLU entries;
first logic for programming the first memory portion, the second memory portion, and the third memory portion,
wherein the first logic is configured to store a plurality of IGP labels in the plurality of TLU entries and to store a plurality of VPN labels in the plurality PLU entries;
second logic for forwarding packets based the first memory portion, the second memory portion, and the third memory portion, wherein the second logic is configured at least to:
retrieve VPN labels from PLU entries, of the plurality of PLU entries, that are respectively associated with the packets to determine IGP load-balancing entries from the plurality of IGP load-balancing entries;
compute a hash value based on a source address and a destination address in the each of the packets to hash into the IGP load-balancing entries to determine TLU entries from the plurality of TLU entries and retrieve IGP labels from the TLU entries; and
generate, for the packets, respective label stacks that respectively include the retrieved VPN labels and the retrieved IGP labels.

2. The apparatus of claim 1, wherein the apparatus is a line card that is installed in any of a switch and a router.

3. The apparatus of claim 1, wherein the second logic comprises a forwarding Application-Specific Integrated Circuit (ASIC) that is operatively connected to the first memory portion, the second memory portion, and third memory wherein the forwarding ASIC comprises logic which is configured to:
retrieve a particular network address identifier from a particular packet that is received at the apparatus;
identify the particular network address identifier in the third memory portion to determine a particular second data structure of the plurality of second data structures that stores the particular network address identifier;
retrieve a particular pointer that is stored in the particular second data structure;
based on the particular pointer, identify a particular first data structure of the plurality of first data structures in the first memory portion; and
determine a forwarding of the particular packet to a particular outgoing interface of the plurality of outgoing interfaces, wherein the particular outgoing interface is indicated by a particular adjacency identifier that is stored in the particular first data structure.

4. The apparatus of claim 3, wherein the forwarding ASIC comprises logic which is configured to:
retrieve a particular VPN label that is stored in the particular second data structure; and
retrieve a particular IGP label that is stored in the particular first data structure,
wherein the second logic is configured to create and append a label stack to the particular packet before the particular packet is dispatched to the particular outgoing interface, wherein the particular VPN label is stored at the bottom of the label stack and the particular IGP label is stored at the top of the label stack.

5. The apparatus of claim 3,
wherein the forwarding ASIC is further configured to:
select a particular IGP load-balancing entry of the plurality of IGP load-balancing entries; and
select a reference value from the two or more reference values included in the particular IGP load-balancing entry, wherein the selected reference value points to the particular first data structure.

6. The apparatus of claim 3, wherein the particular packet received at the apparatus is any one of a Layer 3 network packet and a Layer 2 data link frame.

7. The apparatus of claim 1, wherein the second logic comprises a set of instructions for software forwarding which is configured to:
retrieve a particular network address identifier from a particular packet that is received at the apparatus;
identify the particular network address identifier in the third memory portion to determine a particular second data structure of the plurality of second data structures that stores the particular network address identifier;
retrieve a particular pointer that is stored in the particular second data structure;
based on the particular pointer, identify a particular first data structure of the plurality of first data structures in the first memory portion; and
determine a forwarding of the particular packet to a particular outgoing interface of the plurality of outgoing interfaces, wherein the particular outgoing interface is indicated by a particular adjacency identifier that is stored in the particular first data structure.

8. The apparatus of claim 7, wherein the second logic is configured to:
retrieve a particular VPN label that is stored in the particular second data structure; and
retrieve a particular IGP label that is stored in the particular first data structure,
wherein the second logic is configured to create and append a label stack to the particular packet before the particular packet is dispatched to the particular outgoing interface, wherein the particular VPN label is stored at the bottom of the label stack and the particular IGP label is stored at the top of the label stack.

9. The apparatus of claim 7,
wherein the second logic is further configured to:
select a particular IGP load-balancing entry of the plurality of IGP load-balancing entries; and
select a reference value from the two or more reference values included in the particular IGP load-balancing entry, wherein the selected reference value points to the particular first data structure.

10. The apparatus of claim 7, wherein the particular packet received at the apparatus is any one of a Layer 3 network packet and a Layer 2 data link frame.

11. The apparatus of claim 1, wherein:
the third memory portion is any one of an M-trie memory and a Ternary Content-Addressable memory (TCAM);
the first memory portion comprises one or more adjacency tables that store first information identifying adjacent network elements; and
the third memory portion comprises a Forwarding Information Base (FIB) that stores routing information.

12. The apparatus of claim 1, comprising a line card in a packet router that is installed at an edge of the network and comprising logic which is configured to receive network traffic from other networks and to send the network traffic across the network over a Multi-Protocol Label Switching (MPLS) protocol, wherein the network traffic comprises MPLS network packets.

13. A method for processing network traffic at a network element established in a network, the method comprising the computer-implemented steps of:
storing a plurality of first data structures in a first memory portion, wherein each of the plurality of first data structures includes an Internal Gateway Protocol (IGP) label and an adjacency identifier that identifies one of a plurality of outgoing interfaces in the network element, wherein each IGP label stored in any of the plurality of first data structures indicates a Label Switched Path (LSP) through the network; wherein the first memory portion is a Table-Look-Up (TLU) memory and the plurality of first data structures is a plurality of TLU entries, wherein each of the plurality of first data structures does not include any Virtual Private Network (VPN) label that identifies any VPN that is reachable over the network;
storing a plurality of IGP load-balancing entries in a second memory portion, wherein each of the plurality of IGP load-balancing entries includes two or more reference values that point to two or more of the plurality of first data structures in the first memory portion;
storing a plurality of second data structures in a third memory portion, wherein each of the plurality of second data structures includes a network address identifier, a VPN label associated with the network address identifier, and a pointer that indicates one of the plurality of first data structures stored in the first memory portion, wherein each VPN label stored in any of the plurality of second data structures identifies a VPN that is reachable over the network,
wherein the network address identifier includes a Multi-Protocol Label Switching (MPLS) label,
wherein the third memory portion is a Pointer-Look-Up (PLU) memory and the plurality of second data structures is a plurality of PLU entries,
wherein a hash value is computed based on the network address identifier to select one of multiple VPN labels associated with the network address identifier and the selected VPN label is stored in a PLU entry among the plurality of PLU entries;
forwarding one or more packets across the network over a Multi-Protocol Label Switching (MPLS) protocol based on the plurality of TLU entries and the plurality of PLU entries,
wherein forwarding the one or more packets across the network comprises:
retrieving one or more VPN labels from PLU entries, of the plurality of PLU entries, that are respectively associated with the one or more packets to determine one or more IGP load-balancing entries from the plurality of IGP load-balancing entries;
compute a hash value based on a source address and a destination address in the each of the one or more packets to hash into the one or more IGP load-balancing entries to determine one or more TLU entries from the plurality of TLU entries and retrieve one or more IGP labels from the one or more TLU entries; and
generating, for the one or more packets, respective one or more label stacks that respectively include the one or more VPN labels and the one or more IGP labels;
wherein the steps of the method are performed by the network element.

14. The method of claim 13, wherein forwarding the one or more packets across the network further comprises:
receiving a particular packet of the one or more packets at an inbound interface of the network element;
retrieving a particular network address identifier from the particular packet;
identifying the particular network address identifier in the third memory portion to determine a particular second data structure of the plurality of second data structures that stores the particular network address identifier;
retrieving a particular pointer that is stored in the particular second data structure;
based on the particular pointer, identifying a particular first data structure of the plurality of first data structures in the first memory portion; and
making a forwarding decision to dispatch the particular packet to a particular outgoing interface of the plurality of outgoing interfaces, wherein the particular outgoing interface is indicated by a particular adjacency identifier that is stored in the particular first data structure.

15. The method of claim 14, wherein:
retrieving the one or more VPN labels comprises retrieving a particular VPN label that is stored in the particular second data structure;
retrieving the one or more IGP labels comprises retrieving a particular IGP label that is stored in the particular first data structure; and
generating the one or more label stacks comprises creating and appending a label stack to the particular packet before the particular packet is dispatched to the particular outgoing interface, wherein the particular VPN label is stored at the bottom of the label stack and the particular IGP label is stored at the top of the label stack.

16. The method of claim 14, wherein identifying the particular first data structure further comprises:
   selecting a particular IGP load-balancing entry of the plurality of IGP load-balancing entries; and
   selecting a reference value from the two or more reference values included in the particular IGP load-balancing entry, wherein the selected reference value points to the particular first data structure.

17. The method of claim 14, wherein the particular network address identifier in the particular packet is a particular MPLS label.

18. A non-transitory computer-readable volatile or non-volatile medium storing logic for processing network traffic at a network element established in a network, which logic is configured at least to:
   store a plurality of first data structures in a first memory portion, wherein each of the plurality of first data structures includes an Internal Gateway Protocol (IGP) label and an adjacency identifier that identifies one of a plurality of outgoing interfaces in the network element, wherein each IGP label stored in any of the plurality of first data structures indicates a Label Switched Path (LSP) through the network,
   wherein the first memory portion is a Table-Look-Up (TLU) memory and the plurality of first data structures is a plurality of TLU entries,
   wherein each of the plurality of first data structures does not include any Virtual Private Network (VPN) label that identifies any VPN that is reachable over the network;
   store a plurality of IGP load-balancing entries in a second memory portion, wherein each of the plurality of IGP load-balancing entries includes two or more reference values that point to two or more of the plurality of first data structures in the first memory portion;
   store a plurality of second data structures in a third memory portion, wherein each of the plurality of second data structures includes a network address identifier, a VPN label associated with the network address identifier, and a pointer that indicates one of the plurality of first data structures stored in the first memory portion, wherein each VPN label stored in any of the plurality of second data structures identifies a VPN that is reachable over the network,
   wherein the network address identifier includes a Multi-Protocol Label Switching (MPLS) label,
   wherein the third memory portion is a Pointer-Look-Up (PLU) memory and the plurality of second data structures is a plurality of PLU entries,
   wherein a hash value is computed based on the network address identifier to select one of multiple VPN labels associated with the network address identifier and the selected VPN label is stored in a PLU entry among the plurality of PLU entries;
   forward one or more packets across the network over a Multi-Protocol Label Switching (MPLS) protocol based on the plurality of TLU entries and the plurality of PLU entries;
   wherein the logic configured to forward the one or more packets is configured at least to:
      retrieve one or more VPN labels from PLU entries, of the plurality of PLU entries, that are respectively associated with the one or more packets to determine IGP load-balancing entries from the plurality of IGP load-balancing entries;
      compute a hash value based on a source address and a destination address in the each of the one or more packets to hash into the one or more IGP load-balancing entries to determine one or more TLU entries from the plurality of TLU entries and retrieve one or more IGP labels from the one or more TLU entries; and
      generate, for the one or more packets, respective one or more label stacks that respectively include the one or more VPN labels and the one or more IGP labels.

19. The non-transitory computer-readable volatile or non-volatile medium of claim 18, wherein the logic configured to forward the one or more packets is further configured to:
   receive a particular packet of the one or more packets at an inbound interface of the network element;
   retrieve a particular network address identifier from the particular packet;
   identify the particular network address identifier in the third memory portion to determine a particular second data structure of the plurality of second data structures that stores the particular network address identifier;
   retrieve a particular pointer that is stored in the particular second data structure;
   based on the particular pointer, identify a particular first data structure of the plurality of first data structures in the first memory portion; and
   make a forwarding decision to dispatch the particular packet to a particular outgoing interface of the plurality of outgoing interfaces, wherein the particular outgoing interface is indicated by a particular adjacency identifier that is stored in the particular first data structure.

20. The non-transitory computer-readable volatile or non-volatile medium of claim 19, wherein the logic configured to forward the one or more packets is configured to:
   retrieve a particular VPN label that is stored in the particular second data structure;
   retrieve a particular IGP label that is stored in the particular first data structure; and
   create a label stack and append the label stack to the particular packet before the particular packet is dispatched to the particular outgoing interface, wherein the particular VPN label is stored at the bottom of the label stack and the particular IGP label is stored at the top of the label stack.

21. The non-transitory computer-readable volatile or non-volatile medium of claim 19, wherein the logic configured to identify the particular first data structure is further configured to:
   select a particular IGP load-balancing entry of the plurality of IGP load-balancing entries; and
   select a reference value from the two or more reference values included in the particular IGP load-balancing entry, wherein the selected reference value points to the particular first data structure.

22. The non-transitory computer-readable volatile or non-volatile medium of claim 19, wherein the particular network address identifier in the particular packet is a particular MPLS label.

23. An apparatus, comprising:
   a first memory portion comprising a plurality of Table-Look-Up (TLU) entries, wherein each of the plurality of TLU entries includes an Internal Gateway Protocol (IGP) label and an adjacency identifier that identifies one of a plurality of outgoing interfaces associated with the apparatus, wherein each IGP label indicates a Label Switched Path (LSP) through a network, wherein each of the plurality of TLU entries does not include any Virtual Private Network (VPN) label that identifies any VPN that is reachable over the network;
a second memory portion comprising a plurality of IGP load-balancing entries, wherein each of the plurality of IGP load-balancing entries includes two or more reference values that point to two or more of the plurality of TLU entries in the first memory portion;
a third memory portion comprising a plurality of Pointer-Look-Up (PLU) entries, wherein each of the plurality of PLU entries includes a network address identifier, a VPN label associated with the network address identifier, and a pointer that indicates one of the plurality of IGP load-balancing entries stored in the second memory portion, wherein each VPN label identifies a VPN that is reachable over the network,
wherein the network address identifier includes a Multi-Protocol Label Switching (MPLS) label;
wherein a hash value is computed based on the network address identifier to select one of multiple VPN labels associated with the network address identifier and the selected VPN label is stored in a PLU entry among the plurality of PLU entries;
first logic for programming the first memory portion, the second memory portion, and the third memory portion, wherein the first logic is configured to store a plurality of IGP labels in the plurality of TLU entries, to store a plurality of reference values in the plurality of IGP load-balancing entries, and to store a plurality of VPN labels in the plurality of PLU entries,
wherein, in response to a failure of a particular LSP, the first logic is configured to:
  determine particular reference values, in the plurality of IGP load-balancing entries, which point to one or more particular TLU entries that store a particular IGP label that indicates the particular LSP that has failed; and
  update only the determined particular reference values in the plurality of load-balancing entries without updating the one or more particular TLU entries in the first memory portion;
second logic for forwarding one or more packets based the first memory portion, the second memory portion, and the third memory portion, wherein the second logic is configured at least to:
  retrieve one or more VPN labels from PLU entries, of the plurality of PLU entries, that are respectively associated with the one or more packets to determine one or more IGP load-balancing entries among the plurality of IGP load-balancing entries;
  compute a hash value based on a source address and a destination address in the each of the one or more packets to hash into the one or more IGP load-balancing entries to determine one or more TLU entries from the plurality of TLU entries and retrieve one or more IGP labels from the one or more TLU entries; and
  generate, for the one or more packets, respective one or more label stacks that respectively include the one or more VPN labels and the one or more IGP labels.

\* \* \* \* \*

UNITED STATES PATENT AND TRADEMARK OFFICE
CERTIFICATE OF CORRECTION

| | | |
|---|---|---|
| PATENT NO. | : 8,189,585 B2 | Page 1 of 1 |
| APPLICATION NO. | : 11/546054 | |
| DATED | : May 29, 2012 | |
| INVENTOR(S) | : Pranav Dharwadkar et al. | |

It is certified that error appears in the above-identified patent and that said Letters Patent is hereby corrected as shown below:

In the claims:

COLUMN 33

Claim 1 line 31 delete "portion," insert -- portions --

COLUMN 33

Claim 1 line 54 insert -- and -- between ; and second

COLUMN 35

Claim 12 line 39 insert -- any -- between comprises and MPLS

Signed and Sealed this
Seventh Day of August, 2012

David J. Kappos
*Director of the United States Patent and Trademark Office*